(12) United States Patent
Tu et al.

(10) Patent No.: US 11,252,184 B2
(45) Date of Patent: Feb. 15, 2022

(54) ANTI-ATTACK DATA TRANSMISSION METHOD AND DEVICE

(71) Applicant: Alibaba Group Holding Limited, Grand Cayman (KY)

(72) Inventors: Yifan Tu, Hangzhou (CN); Zhao Zhang, Hangzhou (CN); Jiarui Zhu, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 251 days.

(21) Appl. No.: 15/965,486

(22) Filed: Apr. 27, 2018

(65) Prior Publication Data
US 2018/0248910 A1    Aug. 30, 2018

Related U.S. Application Data

(63) Continuation of application No. PCT/CN2016/102646, filed on Oct. 20, 2016.

(30) Foreign Application Priority Data

Oct. 29, 2015  (CN) .......................... 201510719829.1

(51) Int. Cl.
*H04L 29/06*        (2006.01)
(52) U.S. Cl.
CPC ...... *H04L 63/1458* (2013.01); *H04L 63/0227* (2013.01); *H04L 69/04* (2013.01);
(Continued)
(58) Field of Classification Search
CPC . H04L 63/1458; H04L 63/0227; H04L 69/04; H04L 69/08; H04L 69/22; H04L 63/0428
See application file for complete search history.

(56) References Cited

U.S. PATENT DOCUMENTS

2007/0157306 A1* 7/2007 Elrod .................. H04L 63/0227
726/14
2008/0263666 A1* 10/2008 Keohane ............... H04L 63/126
726/23

(Continued)

FOREIGN PATENT DOCUMENTS

| CN | 101404579 | 4/2009 |
| CN | 101669347 | 3/2010 |
| CN | 103532964 | 1/2014 |

OTHER PUBLICATIONS

Translation of International Search Report from corresponding PCT Application No. PCT/CN2016/102646, dated Dec. 30, 2016, 2 pages.

(Continued)

*Primary Examiner* — Kevin Bechtel
*Assistant Examiner* — Forrest L Carey
(74) *Attorney, Agent, or Firm* — Lee & Hayes, P.C.

(57) ABSTRACT

An anti-attack data transmission method and an apparatus thereof are provided. The method includes obtaining a communication protocol message to be transmitted; performing an anti-attack pre-processing for data on information bit(s) located at a message header in the communication protocol message, and generating processing information; storing the processing information in extension bit(s) at the message header of the communication protocol message to obtain a converted communication protocol message, wherein the message header of the communication protocol message includes the information bit(s) and the extension bit(s); and sending the converted communication protocol message to a receiving device. The present disclosure solves the problem of false negatives associated with normally transmitted data flow caused by existing anti-attack methods.

20 Claims, 9 Drawing Sheets

(52) U.S. Cl.
CPC ............. *H04L 69/08* (2013.01); *H04L 69/22* (2013.01); *H04L 63/0428* (2013.01)

(56) References Cited

U.S. PATENT DOCUMENTS

| | | | |
|---|---|---|---|
| 2014/0298021 A1 | 10/2014 | Kwon et al. | |
| 2015/0195267 A1* | 7/2015 | Miyata ................... | H04L 63/08 726/5 |
| 2015/0245351 A1* | 8/2015 | Banerjea ................ | H04H 20/71 370/338 |
| 2017/0034213 A1* | 2/2017 | Murgia ............... | H04L 63/0428 |
| 2018/0109503 A1* | 4/2018 | Nadas ................. | H04L 63/0428 |

OTHER PUBLICATIONS

Translation of Written Opinion from corresponding PCT Application No. PCT/CN2016/102646, dated Dec. 30, 2016, 6 pages.
Translation of CN Office Action from Corresponding CN Application No. 201510719829.1 dated Apr. 10, 2019, a counterpart foreign application for U.S. Appl. No. 15/965,486, 7 pages.
Translation of CN Search Report from Corresponding CN Application No. 201510719829.1 dated Apr. 10, 2019, a counterpart foreign application for U.S. Appl. No. 15/965,486, 2 pages.
Translation of Chinese Office Action dated Dec. 26, 2019, from corresponding CN Patent Application No. 201510719829.1, 8 pages.

* cited by examiner

ANTI-ATTACK DATA TRANSMISSION METHOD AND DEVICE

This application claims priority to and is a continuation of PCT Patent Application No. PCT/CN2016/102646 filed on 20 Oct. 2016, and is related to and claims priority to Chinese Patent Application No. 201510719829.1, filed on 29 Oct. 2015, entitled "Anti-Attack Data Transmission Method and Device," which are hereby incorporated by reference in their entirety.

TECHNICAL FIELD

The present disclosure relates to the field of computers, and particularly to anti-attack data transmission methods and apparatuses.

BACKGROUND

In existing technologies, common communication attacks currently include the following two types:

1. A SYN attack, with an attacking principle as follows: A SYN attack belongs to a type of DOS attacks, which takes advantage of flaws in a TCP protocol and consumes CPU and memory resources by sending a large number of semi-connection requests. Besides being able to affect host computers, a SYN attack can also be detrimental to network systems such as routers and firewalls. In fact, regardless of what type of system a target is, a SYN attack can be implemented given that the system opens a TCP service. A server receives a connection request (syn=j), adds this information into an unconnected queue, and sends a request packet to a client (syn=k, ack=j+1). At this time, a SYN_RECV state is entered. When no acknowledgement packet is received from the client, the server re-sends the request packet until a time is past wherein this information is removed from the unconnected queue. A SYN attack can achieve a better effect if being used with an IP fraud. In general, a client forges a large number of unreal IP addresses in a short period of time, and continuously sends syn packets to a server. The server responds with acknowledgement packets, and waits for acknowledgements from the client. Since source addresses are not real, the server needs to repeat sending until the time is past. These forged SYN packets occupy the connected queue for a long time. Normal SYN requests are dropped, and the target system runs slowly, thus seriously leading to network congestion and even system breakdown.

2. An ACK attack, with an attacking principle as follows: After a TCP connection is established, all data transmitting a TCP message includes an acknowledgement flag bit. Upon receiving a data packet including an acknowledgement flag bit, a host computer needs to examine whether a connection quadruple represented by the data packet exists. If such exists, the host computer examines whether a status represented by the data packet is legitimate, and then transmits the data packet to an application layer. If the data packet is found to be illegitimate (for example, a port targeted by the data packet is not open in the host computer), a system protocol stack of the host computer will return a RST packet, telling the opposite party that this port does not exist. A stateful inspection firewall performs similar tasks, except that the firewall only intercepts illegitimate data packets and does not actively respond thereto.

In a comparison between degrees of complexity of respective operations for a host computer and a firewall after receiving an ACK message and a SYN message, the workload caused by the ACK message is apparently much less. Therefore, in a real environment, the workload of a host computer and a firewall will change a lot only when a rate of sending ACK messages by an attacking program in each second reaches a certain level. When a packet sending rate is high, an operating system of a host computer spends a large amount of effort on receiving messages, determining states thereof, and actively responds with RST messages, such that normal data packets cannot be processed in time. In this case, a behavior of a client (e.g., IE) is a slow response of accessing a page, having a high dropping rate. However, a firewall for state inspection can more effectively filter attack messages by determining whether states of ACK messages are legitimate with the help of strong hardware capabilities thereof. Apparently, when the number of attacks is very large, a firewall is also overwhelmed and results in network breakdown due to the need of maintaining a large number of connection states and examining states of a tremendous number of ACK message.

In order to solve the above problems, a commonly used processing approach is to clean up a broadband capacity. The pressure on a network and a server caused by attack flow is reduced using a method of cleaning the broadband capacity. A solution of broadband capacity cleaning is mainly divided into three operations. At the first operation, a specialized detection device is used to analyze and monitor user service flow. At the second operation, when a server suffers from an attack, the detection device reports thereof to a specialized service management platform for generating a cleaning task and directing the user flow to a flow cleaning center. At the third operation, the flow cleaning center cleans up the directed user flow, and returns the cleaned user flow to the server.

However, in existing cleaning solutions, due to differences in communication protocols, using a flow cleaning approach for defending attacks can very likely lead to false negatives. In other words, normal data flow may be treated as attacking flow for filtering. Currently, no effective solution has been proposed for these problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

According to the embodiments of the present disclosure, an anti-attack data transmission method is provided, which includes obtaining a communication protocol message to be transmitted; performing an anti-attack pre-processing for data on information bit(s) located at a message header in the communication protocol message, and generating processing information; storing the processing information in extension bit(s) at the message header of the communication protocol message to obtain a converted communication protocol message, wherein the message header of the communication protocol message includes the information bit(s) and the extension bit(s); and sending the converted communication protocol message to a receiving device.

In implementations, performing the anti-attack pre-processing for the data on the information bit(s) located at the message header in the communication protocol message includes at least one of: adjusting an order of data in the information bit(s); wholly or partially compressing the data of the information bit(s), and filling a spare space with character(s) after compression; wholly or partially encrypting the data of the information bit(s); or wholly or partially signing the data of the information bit(s).

In implementations, prior to performing the anti-attack pre-processing for the data on the information bit(s) located at the message header in the communication protocol message, the method further includes setting a portion of bytes located at the message header in the communication protocol message as the extension bit(s).

In implementations, setting the portion of bytes located at the message header in the communication protocol message as the extension bit(s) includes setting a portion of bytes of a sequence number and/or an acknowledgement number in the message header as the extension bit(s).

In implementations, prior to sending the converted communication protocol message to the receiving device, the method further includes determining whether data flow of the communication protocol message is greater than a predefined threshold; and configuring a gateway-type network device in a transmission link before the receiving device is reached to enable the gateway-type network device to relay the converted communication protocol message to a third-party device on behalf of the receiving device.

In implementations, an apparatus that performs the anti-attack pre-processing for the data on the information bit(s) located at the message header in the communication protocol message includes at least one of a network card driver, a virtual network card, or a local gateway.

According to the embodiments of the present disclosure, an anti-attack data transmission method is also provided, which includes receiving a communication protocol message that has been converted by an anti-attack pre-processing; analyzing and parsing the converted communication protocol message according to processing information that indicates the anti-attack pre-processing and is located at extension bit(s) of a message header of the converted communication protocol message; and obtaining data located at information bit(s) of the message header of the converted communication protocol message, wherein the message header of the communication protocol message includes the information bit(s) and the extension bit(s).

In implementations, an apparatus that analyzes and parses the converted communication protocol message according to the processing information that indicates the anti-attack pre-processing and is located at the extension bit(s) of the message header of the converted communication protocol message includes at least one of a network card driver, a virtual network card, or a local gateway.

According to the embodiments of the present disclosure, an anti-attack data transmission apparatus is provided, which is located in a sending device. The apparatus includes an acquisition unit used for obtaining a communication protocol message to be transmitted; an anti-attack pre-processing unit used for performing an anti-attack pre-processing for data on information bit(s) located at a message header in the communication protocol message, and generating processing information; a storage unit used for storing the processing information in extension bit(s) at the message header of the communication protocol message to obtain a converted communication protocol message, wherein the message header of the communication protocol message includes the information bit(s) and the extension bit(s); and a sending unit used for sending the converted communication protocol message to a receiving device.

In implementations, the anti-attack pre-processing unit includes at least one of an adjustment module used for adjusting an order of data in the information bit(s); a compression module used for wholly or partially compressing the data of the information bit(s), and filling a spare space with character(s) after compression; an encryption module used for wholly or partially encrypting the data of the information bit(s); or a signing module used for wholly or partially signing the data of the information bit(s).

In implementations, the apparatus further includes a setting unit used for setting a portion of bytes located at the message header in the communication protocol message as the extension bit(s), prior to performing the anti-attack pre-processing for the data on the information bit(s) located at the message header in the communication protocol message.

In implementations, the setting unit includes a setting module used for setting a portion of bytes of a sequence number and/or an acknowledgement number in the message header as the extension bit(s).

In implementations, the apparatus further includes a determination unit used for determining whether data flow of the communication protocol message is greater than a predefined threshold prior to sending the converted communication protocol message to the receiving device; a configuration unit used for configuring a gateway-type network device in a transmission link before the receiving device is reached to enable the gateway-type network device to relay the converted communication protocol message to a third-party device on behalf of the receiving device.

In implementations, the anti-attack pre-processing unit includes at least one of a network card driver, a virtual network card, or a local gateway.

According to the embodiments of the present disclosure, an anti-attack data transmission apparatus is also provided, which is located in a receiving device. The apparatus includes a receiving unit used for receiving a communication protocol message that has been converted by an anti-attack pre-processing; a parsing unit used for analyzing and parsing the converted communication protocol message according to processing information that indicates the anti-attack pre-processing and is located at extension bit(s) of a message header of the converted communication protocol message; and an acquisition unit used for obtaining data located at information bit(s) of the message header of the converted communication protocol message, wherein the message header of the communication protocol message includes the information bit(s) and the extension bit(s).

In implementations, the parsing unit includes at least one of a network card driver, a virtual network card, or a local gateway.

In the embodiments of the present disclosure, a sending device directly performs an anti-attack pre-processing on data at information bit(s) of a communication protocol message to be transmitted, stores processing information associated with the anti-attack pre-processing in extension bit(s) newly configured in the original communication protocol message, and sends a converted communication protocol message to a receiving device. In other words, a sending device achieves distinguishing between a normal data flow and an abnormal data flow by sending a communication protocol message in which data at information bit(s) of a message header has undergone anti-attack pre-processing to a receiving device. This helps the receiving device to obtain a communication protocol message that is obtained by a correct parsing, and filter out an abnormal message that cannot be correctly parsed, thereby achieving a goal of accurately defending attacking activities that occur during transmission without affecting normal communications. This further avoids the problems of false negatives associated with normally transmitted data flow caused by existing anti-attack methods.

Furthermore, in the present embodiments, only data at information bit(s) of a message header is undergone an anti-attack pre-processing, to achieve the transparency of a transmission link, thus avoiding converted communication protocol messages from deciphering, and further improving the security during data transmission.

BRIEF DESCRIPTION OF THE DRAWINGS

Accompanying drawings described herein are used for providing further understanding of the present disclosure, and form a part of the present disclosure. Exemplary embodiments of the present disclosure and a description thereof are used for explaining the present disclosure, and are not construed as improper limitations to the present disclosure. In the accompanying drawings.

DETAILED DESCRIPTION

In order to enable one skilled in the art to understand the solutions of the present disclosure in a better manner, the technical solutions of the embodiments of the present disclosure are described in a clear and complete manner in conjunction with the accompanying drawings of the embodiments of the present disclosure. Apparently, the described embodiments merely represent some and not all of the embodiments of the present disclosure. Based on the embodiments in the present disclosure, all other embodiments obtained by one of ordinary skill in the art without making any creative effort shall fall in the scope of protection of the present disclosure.

It should be noted that terms such as "first" and "second" in the specification, claims and drawings of the present disclosure are used for distinguishing similar objects, and are not necessarily used for describing a specific sequence or a precedence order. It should be understood that these pieces of data used in such a way can be exchanged under suitable conditions, such that the embodiments of the present disclosure described herein can be implemented in an order other than those shown or described herein. Furthermore, terms "include", "contain", or any other variations are intended to cover non-exclusive inclusion. For example, a process, method, system, product or device that includes a series of elements not only includes these elements or units explicitly listed, but also includes other elements or units that are not explicitly listed, or may further include elements that are inherent in the process, method, product or device.

First Embodiment

According to the embodiments of the present disclosure, an embodiment of an anti-attack data transmission method is provided. It should be noted that operations shown in a flowchart of an accompanying drawing can be executed in a computer system, such as a series of computer executable instructions. Furthermore, although a logical order is shown in a flowchart, operations shown or described herein can be executed in an order different therefrom under certain situations.

Figure 1:
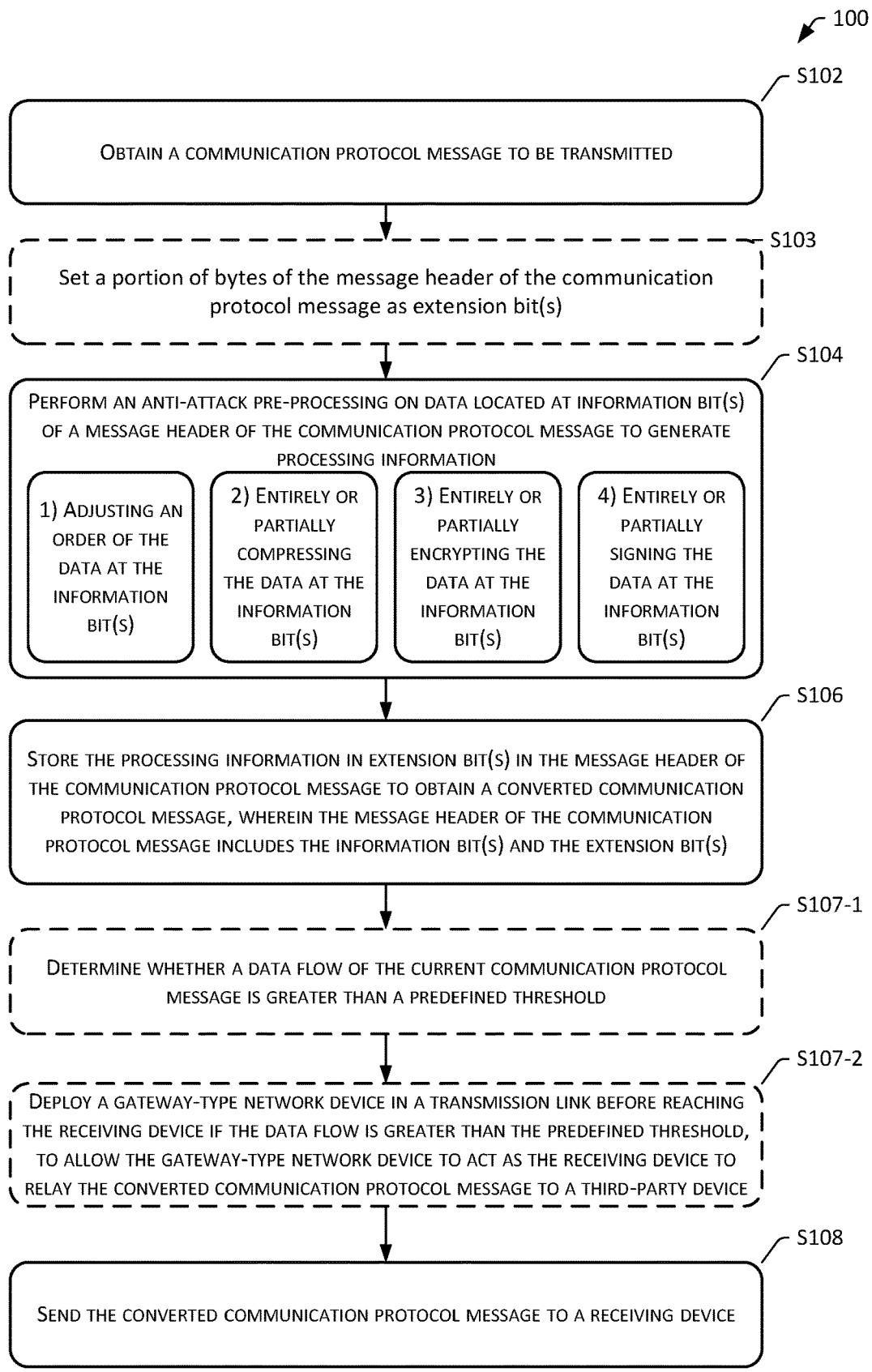
FIG. 1 is a flowchart illustrating an anti-attack data transmission method in accordance with an option of embodiments of the present disclosure.

FIG. 1 is an anti-attack data transmission method 100 in accordance with the embodiments of the present disclosure. As shown in FIG. 1, the method 100 includes the following operations.

S102 obtains a communication protocol message to be transmitted.

S104 performs an anti-attack pre-processing on data located at information bit(s) of a message header of the communication protocol message to generate processing information.

S106 stores the processing information in extension bit(s) in the message header of the communication protocol message to obtain a converted communication protocol message, wherein the message header of the communication protocol message includes the information bit(s) and the extension bit(s).

S108 sends the converted communication protocol message to a receiving device.

Figure 2:
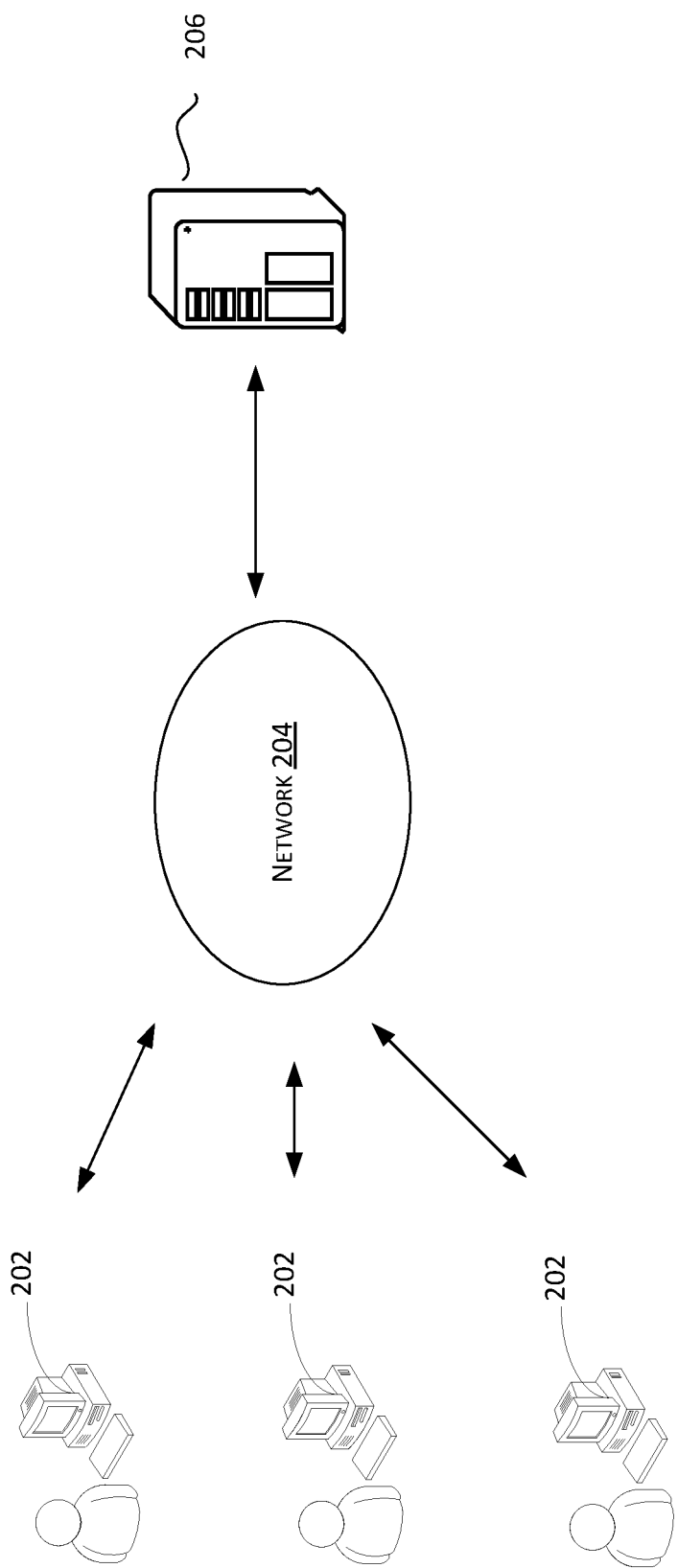
FIG. 2 is a schematic diagram illustrating an application scenario for an anti-attack data transmission method in accordance with an option of embodiments of the present disclosure.

In implementations, the anti-attack data transmission method may be, but is not limited to being, applied to an application environment as shown in FIG. 2. A terminal 202, which acts as a sending device, conducts communications through a network 204 with a server 206, which acts as a receiving device, according to a predefined communication protocol. The network may include, but is not limited to, a local area network, a metropolitan area network, or a wide area network. The terminal may include, but is not limited to, a mobile phone, a PC machine, a laptop, or a tablet computer. The above is merely an example, on which the present embodiment does not impose any limitation.

It should be noted that the sending device may be, but is not limited to, a collection device that is capable of collecting data in the network. An example is a router which can collect communication protocol messages to be transmitted through a NET FLOW protocol.

Specifically, after obtaining a communication protocol message to be transmitted, the terminal 202 (which acts as the sending device) performs an anti-attack pre-processing on data located at information bit(s) of a message header of that message, generates corresponding processing information, stores the processing information at extension bit(s) in the message header of the communication protocol message, and sends a converted communication protocol message to the server 206 (which acts as the receiving device).

It should be noted that, in the present embodiment, a sending device directly performs an anti-attack pre-processing on data at information bit(s) of a communication protocol message to be transmitted, and stores processing information associated with the anti-attack pre-processing in extension bit(s) newly configured in the original communication protocol message. An operation of the anti-attack pre-processing is an operation performed on data at information bit(s) of a message header that is agreed upon between a sending device and a receiving device, to achieve a goal of defending against attack activities that occur during communications. In other words, after the sending device performs the anti-attack pre-processing that is agreed upon with the receiving device, the receiving device can directly perform parsing according to an agreement. If data can be obtained from the parsing, this is a normal data flow. If the parsing cannot be performed normally, a determination can be made that this is an abnormal data flow, and can be dropped directly to defend against an attack activity corresponding to the abnormal data flow. Therefore, improvements in the security and the accuracy of data transmission can be achieved during a process of conducting communications between a sending device and a receiving device according to a communication protocol without affect normal communications. This avoids the problem of false negatives of normally transmitted data flows caused by existing anti-attack methods.

In implementations, the communication protocol message can be, but is not limited to, TCP (Transmission Control Protocol). A data format of a TCP protocol message may include the following:

A data format of a TCP protocol message

| Source port (16 bits) | | | | | | | Target port (16 bits) |
|---|---|---|---|---|---|---|---|
| Sequence number (32 bits) | | | | | | | |
| Acknowledgement number (32 bits) | | | | | | | |
| Header length (4 bits) | Reserved (6 bits) | URG | ACK | PSH | RST | SYN | FIN | Window size (16 bits) |
| TCP checksum (16 bits) | | | | | | | Urgent pointer (16 bits) |
| Option (32 bits) | | | | | | | Fill-in |
| Data | | | | | | | |

As can be seen from the above content, the first 20 bytes in a TCP protocol message are fixed, and the latter 4N bytes are options that are added according to needs. The header length, URG, ACK, RST, SYN, FIN, the window size, the TPC checksum and the urgent pointer are information bits including important information in the TCP protocol message.

Being different from performing an anti-attack protection for an entire TCP protocol message in existing technologies, the present embodiment performs an anti-attack protection using data at information bit(s) of a message header. As such, a receiving device can perform cleaning and filtering on all data flows in a way different from the broadband flow cleaning when the TCP protocol message is received, thus avoiding the problem of incorrectly treating a normal data flow as an abnormal data flow. Therefore, the receiving device can implement directly filtering of communication protocol messages forged by attacking ends by determining whether data at corresponding information bit(s) can be parsed according to an agreed manner, thus further improving the accuracy of defending against attacking activities during a data transmission process. A message format of a converted communication message is given as follows:

A message format of a converted communication message

| Source port (16 bits) | Target port (16 bits) |
|---|---|
| Extension bit [(32-n) bits] | Sequence number (n bits) |
| Extension bit [(32-m) bits] | Acknowledgement number (m bits) |
| Information bit(s) after anti-attack pre-processing | |
| Data | |

In implementations, extension bits in the above communication protocol message can be, but are not limited to, extension bits that are added in an original communication protocol message. In other words, under a condition that a message length is not increased, some positions are set as extension bits used for storing processing information associated with an anti-attack pre-processing, thereby ensuring the security of data transmission without increasing the load overhead of the message.

In implementations, the anti-attack pre-processing may include, but is not limited to, at least one of the following operations:

1) adjusting an order of data on information bits;
2) entirely or partially compressing the data of the information bit(s), and filling a spare space with character(s) after compression;
3) entirely or partially encrypting the data of the information bit(s); or
4) entirely or partially signing the data of the information bit(s).

It should be noted that the entirety of the information bits is used to describe data on all the information bits. The partiality of the information bits is used to describe data in some information bits. Furthermore, the fill-in character can be, but is not limited to, a meaningless character, or may be, but is not limited to, extension bit(s) of other information. The present embodiment does not have any limitation thereon.

In implementations, prior to sending the converted communication protocol message to the receiving device, the method further includes deploying network device(s) at S1. In other words, network device(s) in the network is/are placed according to a data flow that is actually transmitted.

In implementations, when the data flow is greater than a predefined threshold, gateway-type network device(s) is/are set up between the sending device and the receiving device, to help the network device(s) to relay a portion of the data flow to a third-party device, to avoid an occurrence of overloading of the original receiving device, thereby achieving a reduction in the workload of the device and avoiding the problem of a system breakdown of the receiving device due to the occurrence of the overloading.

In implementations, when the data flow is less than or equal to the predefined threshold, at least one of the following apparatuses can be directly set up in the sending device to perform the anti-attack pre-processing of the communication protocol message to be transmitted: a network card driver, a virtual network card, or a local gateway.

Using the embodiments provided by the present disclosure, a sending device directly performs an anti-attack pre-processing on data at information bit(s) of a communication protocol message to be transmitted, stores processing information associated with the anti-attack pre-processing in extension bit(s) newly configured in the original communication protocol message, and sends a converted communication protocol message to a receiving device. In other words, a sending device achieves distinguishing between a normal data flow and an abnormal data flow by sending a communication protocol message in which data at information bit(s) of a message header has undergone anti-attack pre-processing to a receiving device. This helps the receiving device to obtain a communication protocol message that is obtained by a correct parsing, and filter out an abnormal message that cannot be correctly parsed, thereby achieving a goal of accurately defending attacking activities that occur during transmission without affecting normal communications. This further avoids the problems of false negatives associated with normally transmitted data flow caused by existing anti-attack methods. Furthermore, in the present embodiments, only data at information bit(s) of a message header is undergone an anti-attack pre-processing, to achieve the transparency of a transmission link, thus avoiding converted communication protocol messages from deciphering, and further improving the security during data transmission.

In implementations, performing the anti-attack pre-processing on the data at the information bit(s) of the message header of the communication protocol message includes at least one of:

1) Adjusting an order of the data at the information bit(s):

Details are described in conjunction with an example as follows. Information bits located in a message header of a TCP protocol message includes a header length, URG, ACK, RST, SYN, FIN, a window size, a TCP checksum and an urgent pointer. In the present embodiment, when an anti-attack pre-processing is performed on data at these information bits, an order of the data can be adjusted correspondingly to ensure a goal of performing the anti-attack pre-processing for the TCP protocol message to be achieved during a normal process of encapsulation and transmission of the TCP protocol message.

For example, a data format of a TCP protocol message that is converted may be given as follows:

| Source port (16 bits) | | | | | | | Target port (16 bits) |
|---|---|---|---|---|---|---|---|
| Extension bit (4 bits) | Sequence number (28 bits) | | | | | | |
| Extension bit (4 bits) | Acknowledgement number (28 bits) | | | | | | |
| Header length (4 bits) | Reserved (6 bits) | RST | ACK PSH | SYN | URG | FIN | Window size (16 bits) |
| TCP checksum (16 bits) | | | | | | | Urgent pointer (16 bits) |
| Option (32 bits) | | | | | | | Fill-in |
| Data | | | | | | | |

As can be seen from the above content, in the present embodiment, by adjusting an order of URG, RST and SYN, a well-known positional relationship therebetween in a communication protocol message is changed, thereby achieving protection against third-party devices, and avoiding attacks produced by the third-party devices.

2) Entirely or partially compressing the data at the information bit(s):

Details are described in conjunction with an example as follows. Information bits located in a message header of a TCP protocol message includes a header length, URG, ACK, RST, SYN, FIN, a window size, a TCP checksum and an urgent pointer. In the present embodiment, when an anti-attack pre-processing is performed on data at these information bits, data at the information bits can be wholly or partially compressed to ensure a goal of performing the anti-attack pre-processing for the TCP protocol message to be achieved during a normal process of encapsulation and transmission of the TCP protocol message.

For example, a data format of a TCP protocol message that is converted may be given as follows:

| Source port (16 bits) | | | | | | | Target port (16 bits) |
|---|---|---|---|---|---|---|---|
| Extension bit (4 bits) | Sequence number (28 bits) | | | | | | |
| Extension bit (4 bits) | Acknowledgement number (28 bits) | | | | | | |
| Header length (4 bits) | Reserved (6 bits) | URG | ACK PSH | RST | SYN | FIN | Window size (16 bits) |
| TCP checksum (10 bits) | | Fill-in character (6 bits) | | | | | Urgent pointer (16 bits) |
| Option (32 bits) | | | | | | | Fill-in |
| Data | | | | | | | |

As can be seen from the above content, in the present embodiment, partial compression is performed on the TCP checksum, for example, from 16 bits to 10 bits, and certain characters is/are filled into the spare space after the compression, to change a positional relationship of the TCP checksum in the communication protocol message, thereby achieving protection against third-party devices, and avoiding attacks produced by the third-party devices.

3) Entirely or partially encrypting the data at the information bit(s):

In implementations, all the data in the information bits can be encrypted. Alternatively, only data in a portion of the information bits at predefined positions is encrypted. The present embodiment does not have any limitation on the method of encryption.

4) Entirely or partially signing the data at the information bit(s):

In implementations, signing refers to a numeral string that can only be generated by a sender of information and cannot be forged by others. This numeral string is also effective evidence about the authenticity of the information sent by the sender of the information.

In implementations, all the data at the information bits is entirely undergone signature authentication. Alternatively, only data in a portion of the information bits at predefined positions is undergone partial signature authentication. The present embodiment does not have any limitation on the method of signing.

Using the embodiments provided by the present disclosure, by performing an anti-attack pre-processing on data located at information bit(s) of a message header of a communication protocol message through at least one of the above operations, the security of the communication protocol message to be transmitted is further improved by performing the pre-processing on the data of the message header. This thereby prevents a third-party device from initiating an attack after deciphering the above operation of the pre-processing. Furthermore, this also allows a receiving device to parse a converted communication protocol message that is obtained according to a manner corresponding to the operation of pre-processing, and corrects distinguishes between a normal data flow and an abnormal data flow, thus resolving the problem of false negatives occurring in the existing technologies.

In implementations, prior to performing the anti-attack pre-processing on the data at the information bit(s) of the message header of the communication protocol message, the method further includes:

S103: setting a portion of bytes of the message header of the communication protocol message as extension bit(s).

In implementations, setting the portion of bytes of the message header of the communication protocol message as the extension bit(s) includes setting a portion of bytes of a sequence number and/or an acknowledgement number in the message header as the extension bit(s).

In implementations, the anti-attack data transmission is implemented based on a TCP protocol message. Taking into consideration of the characteristics of the IP relay and the TCP protocol, the present embodiment implements pre-processing on a TCP protocol message that is to be transmitted without increasing the load overhead of the message (i.e., without increasing a length of the message) by setting a portion of original segments in a message header of the TCP protocol message as extension bits, thus ensuring the compatibility and the consistency of the TCP protocol in a transmission process.

It should be noted that a sequence number and an acknowledgement number in a TCP protocol message are both 32 bits. These two numbers are used for identifying a length of a previously transmitted message. Taking into consideration of a current network transmission environment, a maximum length of a single message is 8192 bytes (Jumbo frame length) under an Ethernet network. 32 bits may represent $2^{32}$=4G bytes. Therefore, this portion of data has an available space. For example, 28 bits thereof are used as a sequence number, and each has 4 bits to be reserved for extension bits. As such, these 8 bits can be used for identifying processing information of the above pre-processing. At least one type of operations such as signing, TCP header reorganization, blurring, encryption, etc., is performed on data at information bits of a message header using these extension bits, and the TCP communication protocol message after conversion is sent to a receiving device.

Using the embodiments provided by the present disclosure, an operation of pre-processing on data at information bits of a message header using extension bits is implemented by setting the extension bits in an original communication protocol message. This helps a receiving device to correctly parse corresponding data according to an agreement, and thereby accurately distinguish between a normal data flow and an abnormal data flow. Accordingly, the problem of false negatives of normal transmitted data flows that exist in the existing technologies is resolved.

In implementations, prior to sending the converted communication protocol message to the receiving device, the method further includes:

S107-1: determining whether a data flow of the current communication protocol message is greater than a predefined threshold; and S107-2: deploying a gateway-type network device in a transmission link before reaching the receiving device if the data flow is greater than the predefined threshold, to allow the gateway-type network device to act as the receiving device to relay the converted communication protocol message to a third-party device.

In implementations, when a data flow is greater than a predefined threshold, a gateway-type network device is set up between the sending device and the receiving device, to allow the gateway-type network device to relay a portion of the data flow to a third-party device, thus avoiding an occurrence of overloading of the original receiving device. The workload of the device is thereby reduced, and the receiving device is avoided from the problem of system breakdown due to overloading. The predefined threshold can be, but is not limited to, determined according to processing workload of the receiving device.

Figure 3:
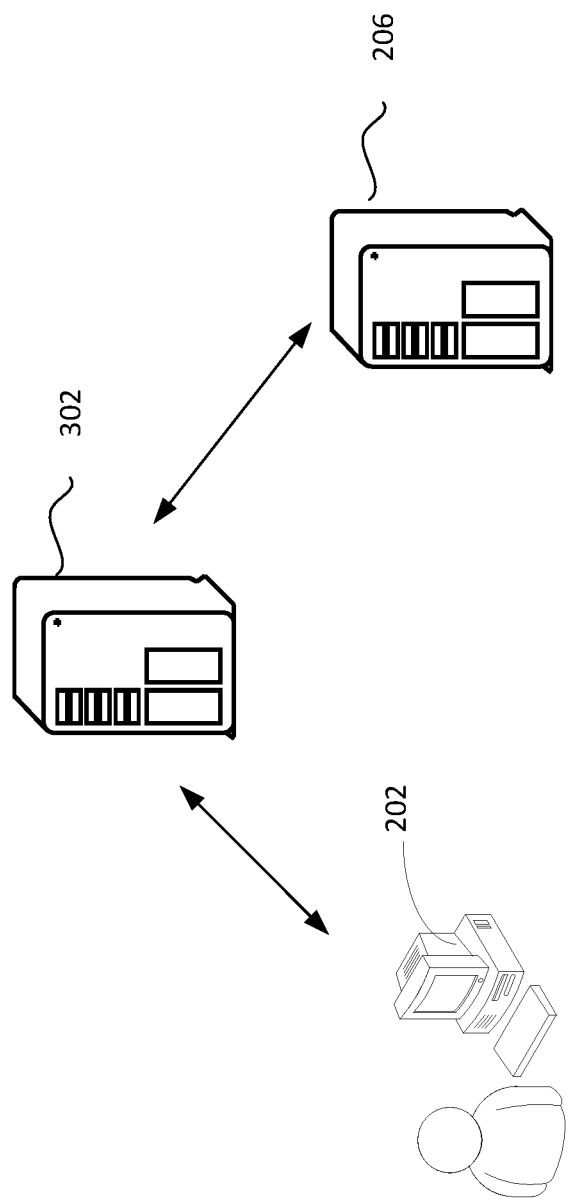
FIG. 3 is a schematic diagram illustrating an anti-attack data transmission method in accordance with an option of embodiments of the present disclosure.

Details are described in conjunction with the following example. A TCP protocol message is used as an example. As shown in FIG. 3, before the terminal 202 sends a TCP protocol message to the server 206, the terminal 202 (which acts as a sending device) can determine whether the server 206 (which acts as a receiving device) can operate normally based on a current network flow. For example, if a predefined threshold is 100M and a current data flow is 120M, the terminal 202 deploys a gateway-type network device 302 in a network upon determining that the data flow is greater than the predefined threshold after comparison, in order to allow the gateway-type network device 302 to transmit the excess 20M of data flow to a third-party device, thus avoiding the problem of a system breakdown of the receiving device due to overloading.

Using the embodiments provided by the present disclosure, a comparison of size relationship between a data flow of a current communication protocol message and a predefined threshold is performed first to facilitate a determination of whether to deploy a gateway-type network device in a transmission link, thereby successfully avoiding the problem of a system breakdown of a receiving device due to overloading in an anti-attack process.

In implementations, an apparatus that performs the anti-attack pre-processing on the data located at the information bit(s) of the message header of the communication protocol message includes at least one of a network card driver, a virtual network card, or a local gateway.

Details are described in conjunction with the following example.

Figure 4:
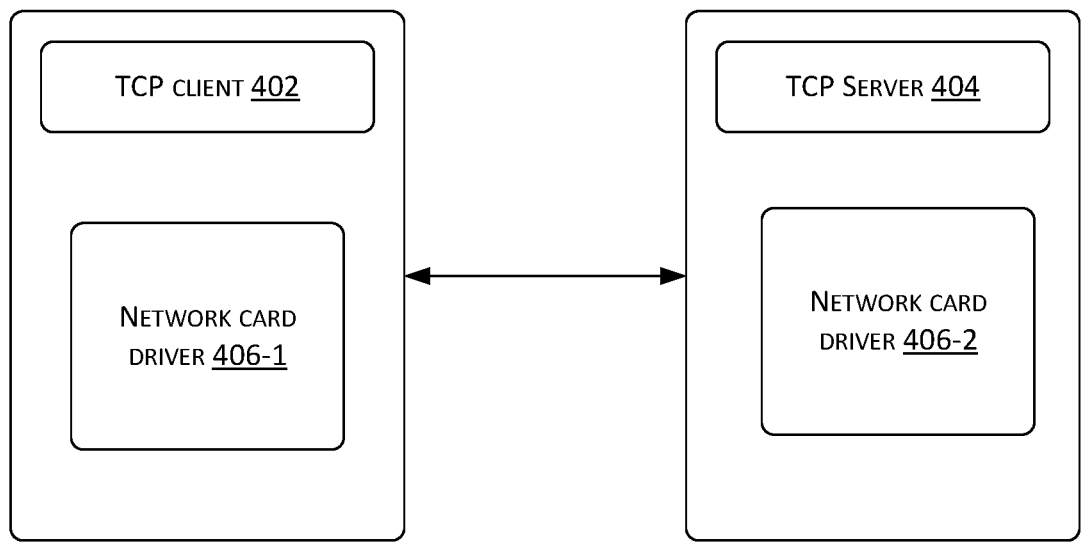
FIG. 4 is a schematic diagram illustrating an anti-attack data transmission method in accordance with another option of embodiments of the present disclosure.

In implementations, a TCP protocol message is used as an example as shown in FIG. 4. A terminal which acts as a sending device is deployed with a TCP client 402, and a server which acts as a receiving device is deployed with a TCP server 404. In the present embodiment, a network card driver 406-1 is set up as an anti-attack apparatus in the TCP client, to implement the pre-processing operation in the anti-attack transmission method as described above. The TCP server is set up with a network card driver 406-2, which acts as an anti-attack checking apparatus for implementing the parsing operation in the anti-attack transmission method as described above.

It should be noted that the TCP client still conducts communications normally using a physical network card in the present embodiment, except that the network card driver checks destinations of the communications. If found to conducts a communication with an external TCP protocol anti-attack checking apparatus, a data message is processed according to a format that is agreed upon in advance. Otherwise, the original message is sent to a destination.

Figure 5:
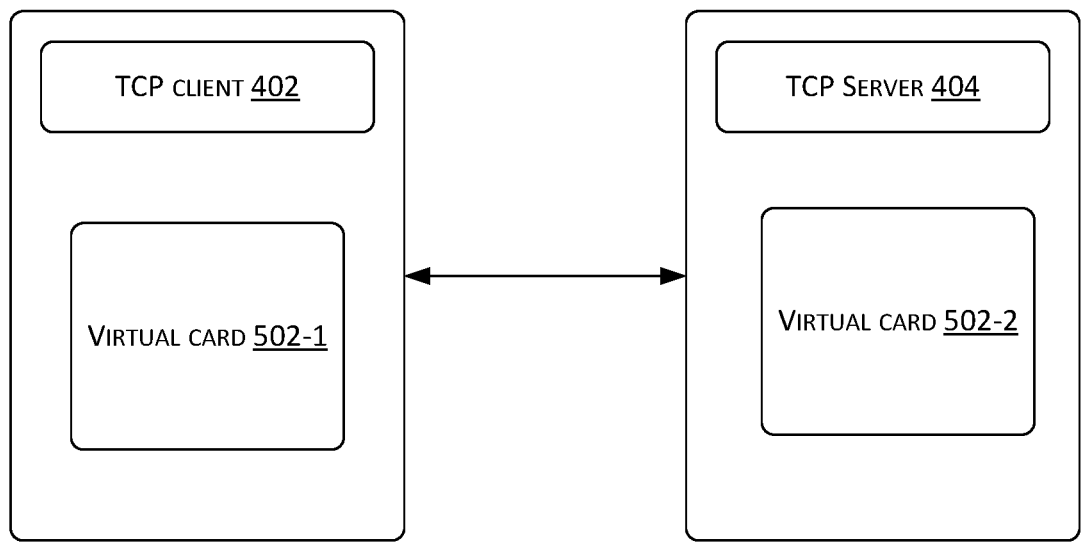
FIG. 5 is a schematic diagram illustrating an anti-attack data transmission method in accordance with another option of embodiments of the present disclosure.

In implementations, a TCP protocol message is used as an example as shown in FIG. 5. A terminal which acts as a sending device is deployed with a TCP client 402, and a server which acts as a receiving device is deployed with a TCP server 404. In the present embodiment, a virtual card 502-1 is set up as an anti-attack apparatus in the TCP client, to implement the pre-processing operation in the anti-attack transmission method as described above. The TCP server is set up with a virtual card 502-2, which acts as an anti-attack checking apparatus for implementing the parsing operation in the anti-attack transmission method as described above.

It should be noted that this type is relatively similar to a link tunnel in the present embodiment. The TCP client only needs to send data to a designated network card. Physical link changes are not perceived in actual operations. All communications with an external TCP protocol anti-attack checking apparatus are handled by the virtual network card.

Figure 6:
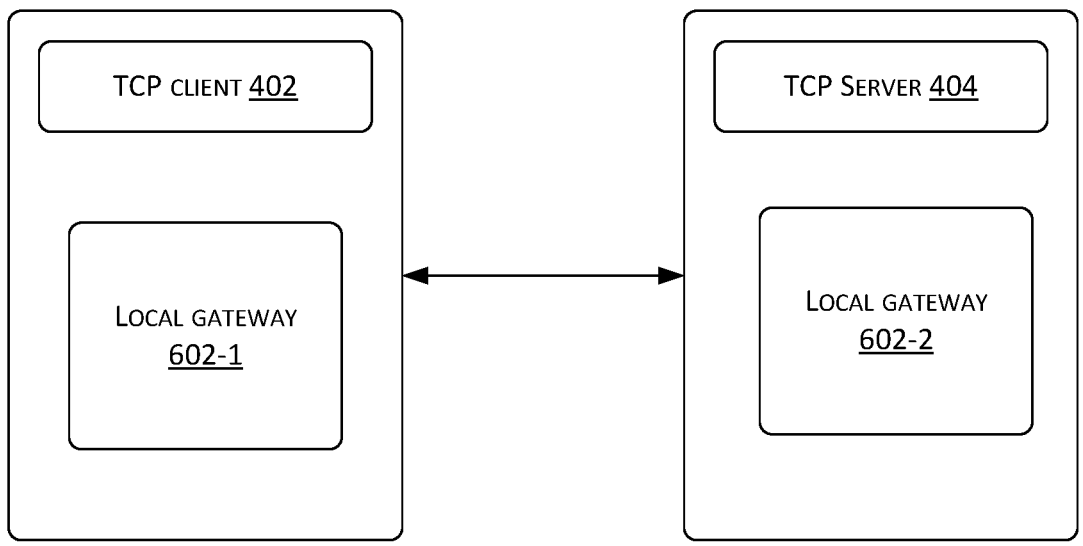
FIG. 6 is a schematic diagram illustrating an anti-attack data transmission method in accordance with another option of embodiments of the present disclosure.

In implementations, a TCP protocol message is used as an example as shown in FIG. 6. A terminal which acts as a sending device is deployed with a TCP client, and a server which acts as a receiving device is deployed with a TCP server. In the present embodiment, a local gateway 602-1 is set up as an anti-attack apparatus in the TCP client, to implement the pre-processing operation in the anti-attack transmission method as described above. The TCP server is set up with a local gateway 602-2, which acts as an anti-attack checking apparatus for implementing the parsing operation in the anti-attack transmission method as described above.

It should be noted that the TCP client only needs to establish a communication relationship with the local gateway in this type of scenario in the present embodiment. The local gateway is responsible for communicating with an external TCP protocol anti-attack checking apparatus.

Using the embodiments provided by the present disclosure, the above anti-attack data transmission can be implemented using different apparatuses, thus implementing diversification of anti-attack control.

Second Embodiment

According to the embodiments of the present disclosure, an embodiment of an anti-attack data transmission method is provided. It should be noted that operations shown in a flowchart of an accompanying drawing can be executed in a computer system, such as a series of computer executable instructions. Furthermore, although a logical order is shown in a flowchart, operations shown or described herein can be executed in an order different therefrom under certain situations.

Figure 7:
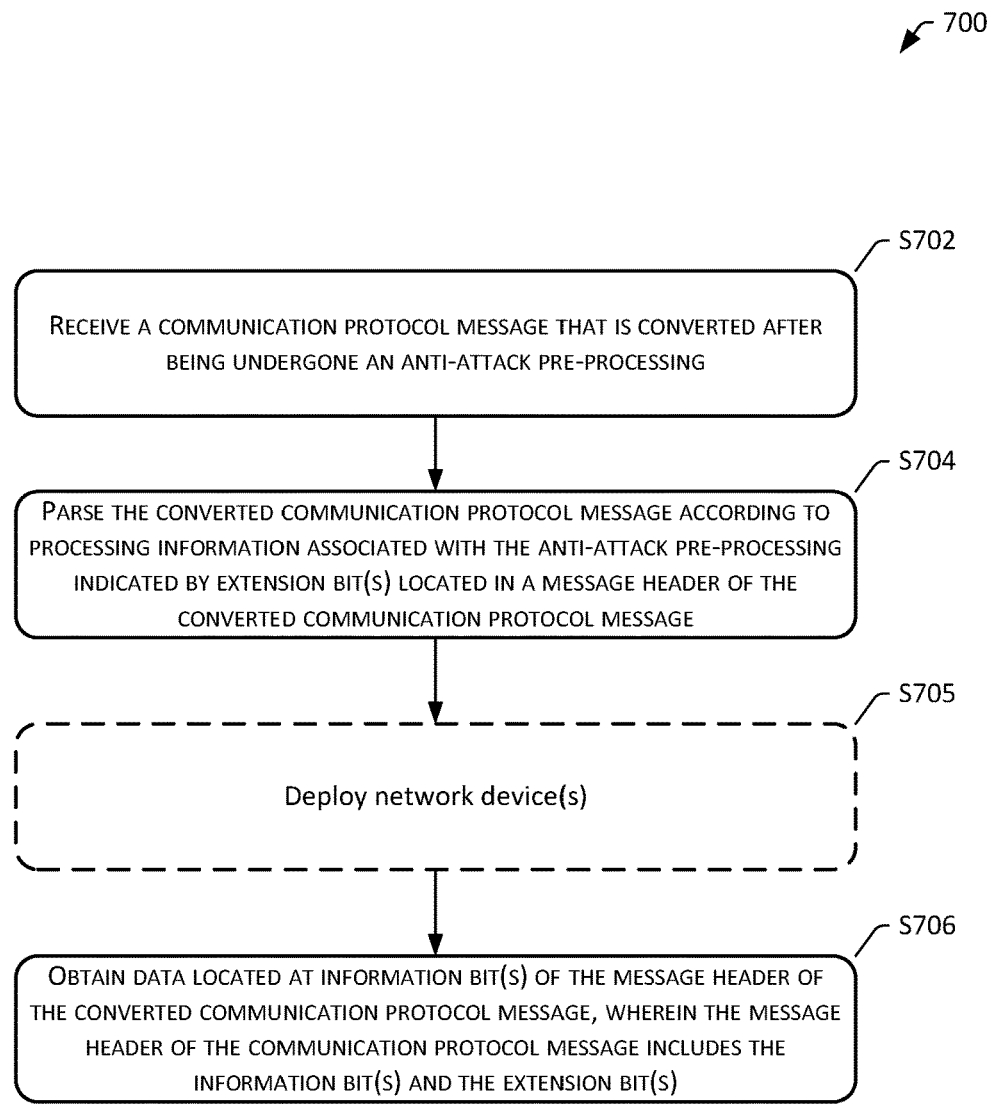
FIG. 7 is a schematic diagram illustrating an anti-attack data transmission method in accordance with another option of embodiments of the present disclosure.

FIG. 7 is an anti-attack data transmission method 700 in accordance with the embodiments of the present disclosure. As shown in FIG. 7, the method includes the following operations.

S702 receives a communication protocol message that is converted after being undergone an anti-attack pre-processing.

S704 parses the converted communication protocol message according to processing information associated with the anti-attack pre-processing indicated by extension bit(s) located in a message header of the converted communication protocol message.

S706 obtains data located at information bit(s) of the message header of the converted communication protocol message, wherein the message header of the communication protocol message includes the information bit(s) and the extension bit(s).

In implementations, the anti-attack data transmission method may be, but is not limited to, applied in an application environment as shown in FIG. 2. A terminal 202, which acts as a sending device, conducts communications through a network 204 with a server 206, which acts as a receiving device, according to a predefined communication protocol. The network may include, but is not limited to, a local area network, a metropolitan area network, or a wide area network. The terminal may include, but is not limited to, a mobile phone, a PC machine, a laptop, or a tablet computer. The above is merely an example, on which the present embodiment does not impose any limitation.

It should be noted that the receiving device may be, but is not limited to, a router. A communication protocol message is obtained by installing a predefined program in the router to implement parsing of processing information associated with an anti-attack pre-processing indicated by extension bit(s) located in a message header of the converted communication protocol message that is received.

Specifically, the server 206 (which acts as the receiving device) receives a communication protocol message that is obtained from conversion after an anti-attack pre-processing, and also parses the converted communication protocol message according to processing information associated with the anti-attack pre-processing indicated by extension bit(s) located in a message header of the converted communication protocol message, to obtain data located at information bit(s) of the message header of the converted communication protocol message. The message header of the communication protocol message includes information bits and extension bits.

It should be noted that, in the present embodiment, a sending device directly performs an anti-attack pre-processing on data at information bit(s) of a communication protocol message to be transmitted, and stores processing information associated with the anti-attack pre-processing in extension bit(s) newly configured in the original communication protocol message, to enable a receiving device to parse and obtain data on the information bit(s) of the message header according to an agreement between the two parties. If data can be correctly parsed, this is a normal data flow. If it is not able to be parsed correctly, a determination can be made that this is an abnormal data flow, and can be dropped directly to defend against an attack activity corresponding to the abnormal data flow. Therefore, improvements in the security and the accuracy of data transmission can be achieved during a process of conducting communications between a sending device and a receiving device according to a communication protocol without affect normal communications. This avoids the problem of false negatives of normally transmitted data flows caused by existing anti-attack methods.

In implementations, the communication protocol message can be, but is not limited to, TCP (Transmission Control Protocol). A data format of a TCP protocol message may include the following:

A data format of a TCP protocol message

| | |
|---|---|
| Source port (16 bits) | Target port (16 bits) |
| Sequence number (32 bits) | |
| Acknowledgement number (32 bits) | |
| Header length (4 bits)  Reserved  URG  ACK  PSH  RST  SYN  FIN (6 bits) | Window size (16 bits) |
| TCP checksum (16 bits) | Urgent pointer (16 bits) |
| Option (32 bits) | Fill-in |
| Data | |

As can be seen from the above content, the first 20 bytes in a TCP protocol message are fixed, and the latter 4N bytes are options that are added according to needs. The header length, URG, ACK, RST, SYN, FIN, the window size, the TPC checksum and the urgent pointer are information bits including important information in the TCP protocol message.

Being different from performing an anti-attack protection for an entire TCP protocol message in existing technologies, the present embodiment performs an anti-attack protection using data at information bit(s) of a message header. As such, a receiving device can perform cleaning and filtering on all data flows in a way different from the broadband flow cleaning when the TCP protocol message is received, thus avoiding the problem of incorrectly treating a normal data flow as an abnormal data flow. Therefore, the receiving device can implement directly filtering of communication protocol messages forged by attacking ends by determining whether data at corresponding information bit(s) can be parsed according to an agreed manner, thus further improving the accuracy of defending against attacking activities during a data transmission process. A message format of a converted communication message is given as follows:

A message format of a converted communication message

| | |
|---|---|
| Source port (16 bits) | Target port (16 bits) |
| Extension bit [(32-n) bits] | Sequence number (n bits) |
| Extension bit [(32-m) bits] | Acknowledgement number (m bits) |
| Information bit(s) after anti-attack pre-processing | |
| Data | |

In implementations, extension bits in the above communication protocol message can be, but are not limited to, extension bits that are added in an original communication protocol message. In other words, under a condition that a message length is not increased, some positions are set as extension bits used for storing processing information associated with an anti-attack pre-processing, thereby ensuring the security of data transmission without increasing the load overhead of the message.

In implementations, the anti-attack pre-processing may include, but is not limited to, at least one of the following operations:

1) adjusting an order of data on information bits;
2) entirely or partially compressing the data of the information bit(s), and filling a spare space with character(s) after compression;
3) entirely or partially encrypting the data of the information bit(s); or
4) entirely or partially signing the data of the information bit(s).

It should be noted that the entirety of the information bits is used to describe data on all the information bits. The partiality of the information bits is used to describe data in some information bits. Furthermore, the fill-in character can be, but is not limited to, a meaningless character, or may be, but is not limited to, extension bit(s) of other information. The present embodiment does not have any limitation thereon.

In implementations, prior to sending the converted communication protocol message to the receiving device, the method further includes deploying network device(s) at S705. In other words, network device(s) in the network is/are placed according to a data flow that is actually transmitted.

In implementations, when the data flow is greater than a predefined threshold, gateway-type network device(s) is/are set up between the sending device and the receiving device, to help the network device(s) to relay a portion of the data flow to a third-party device, to avoid an occurrence of overloading of the original receiving device, thereby achieving a reduction in the workload of the device and avoiding the problem of a system breakdown of the receiving device due to the occurrence of the overloading.

In implementations, when the data flow is less than or equal to the predefined threshold, at least one of the following apparatuses can be directly set up in the sending device to perform the anti-attack pre-processing of the communication protocol message to be transmitted: a network card driver, a virtual network card, or a local gateway.

Using the embodiments of the present disclosure, the server 206, which acts as a receiving device, receives a communication protocol message that is converted after being undergone an anti-attack pre-processing, and parses the converted communication protocol message according to processing information associated with the anti-attack pre-processing indicated by extension bit(s) of a message header of the converted communication protocol message to obtain data located at information bit(s) of the message header of the converted communication protocol message. The message header of the communication protocol message includes information bits and extension bits. In other words, the receiving device parses the data on the information bits of the message header of the communication protocol message that is received, processes a normal data flow that is correctly parsed, and filters an abnormal data flow, thus achieving to distinguish between normal data flows and abnormal data flows. This helps the receiving device to achieve a goal of accurately defending against attack activities in a communication process without affecting normal communications by obtaining communication protocol messages that are correctly parsed and filtering abnormal messages that cannot be correctly parsed. The problem of incorrectly determining normally transmitted data flows caused by existing anti-attack methods is prevented.

In implementations, an apparatus that performs the parsing of the converted communication protocol message according to the processing information associated with the anti-attack pre-processing indicated by the extension bit(s) located at the message header of the converted communication protocol message includes at least one of a network card driver, a virtual network card, or a local gateway.

Details are described in conjunction with the following example.

As an optional manner of implementation, a TCP protocol message is used as an example as shown in FIG. 4. A terminal which acts as a sending device is deployed with a TCP client 402, and a server which acts as a receiving device is deployed with a TCP server 404. In the present embodiment, a network card driver 406-1 is set up as an anti-attack apparatus in the TCP client, to implement the pre-processing operation in the anti-attack transmission method as described above. The TCP server is set up with a network card driver 406-2, which acts as an anti-attack checking apparatus for implementing the parsing operation in the anti-attack transmission method as described above.

It should be noted that the TCP client still conducts communications normally using a physical network card in the present embodiment, except that the network card driver checks destinations of the communications. If found to conducts a communication with an external TCP protocol anti-attack checking apparatus, a data message is processed according to a format that is agreed upon in advance. Otherwise, the original message is sent to a destination.

As another optional implementation, a TCP protocol message is used as an example as shown in FIG. 5. A terminal which acts as a sending device is deployed with a TCP client 402, and a server which acts as a receiving device is deployed with a TCP server 404. In the present embodiment, a virtual card 502-1 is set up as an anti-attack apparatus in the TCP client, to implement the pre-processing operation in the anti-attack transmission method as described above. The TCP server is set up with a virtual card 502-2, which acts as an anti-attack checking apparatus for implementing the parsing operation in the anti-attack transmission method as described above.

It should be noted that this type is relatively similar to a link tunnel in the present embodiment. The TCP client only needs to send data to a designated network card. Physical link changes are not perceived in actual operations. All communications with an external TCP protocol anti-attack checking apparatus are handled by the virtual network card.

As another optional implementation, a TCP protocol message is used as an example as shown in FIG. 6. A terminal which acts as a sending device is deployed with a TCP client, and a server which acts as a receiving device is deployed with a TCP server. In the present embodiment, a local gateway 602-1 is set up as an anti-attack apparatus in the TCP client, to implement the pre-processing operation in the anti-attack transmission method as described above. The TCP server is set up with a local gateway 602-2, which acts as an anti-attack checking apparatus for implementing the parsing operation in the anti-attack transmission method as described above.

It should be noted that the TCP client only needs to establish a communication relationship with the local gateway in this type of scenario in the present embodiment. The local gateway is responsible for communicating with an external TCP protocol anti-attack checking apparatus.

Using the embodiments provided by the present disclosure, the above anti-attack data transmission can be implemented using different apparatuses, thus implementing diversification of anti-attack control.

Third Embodiment

Figure 8:
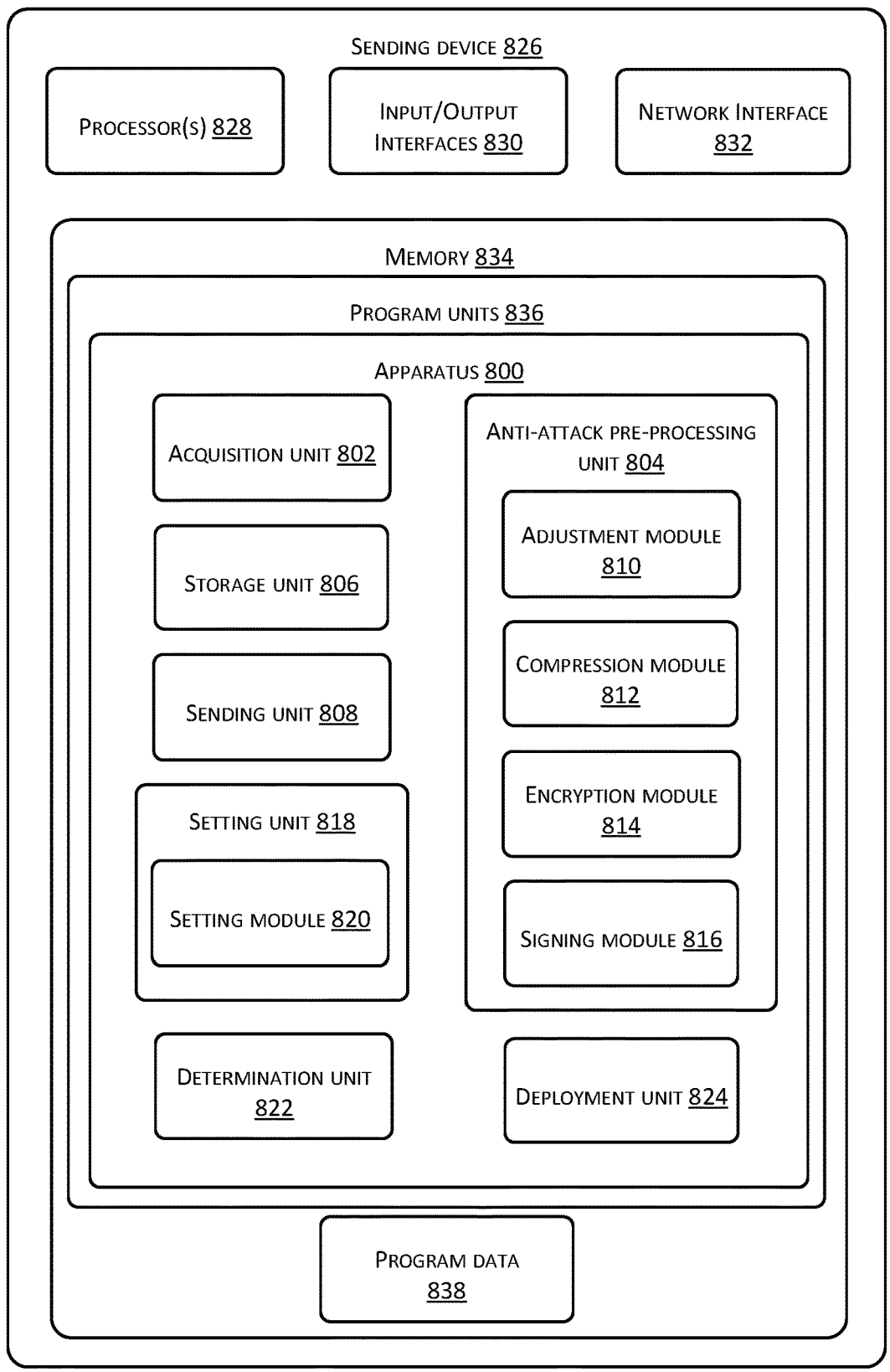
FIG. 8 is a schematic diagram illustrating an anti-attack data transmission apparatus in accordance with an option of embodiments of the present disclosure.

According to the embodiments of the present disclosure, an embodiment of an anti-attack data transmission apparatus is provided. The apparatus is located in a sending device. As shown in FIG. 8, the apparatus 800 includes an acquisition unit 802 used for obtaining a communication protocol message to be transmitted; an anti-attack pre-processing unit 804 used for performing an anti-attack pre-processing on data located at information bit(s) of a message header of the communication protocol message to generate processing information; a storage unit 806 used for storing the processing information in extension bit(s) in the message header of the communication protocol message to obtain a converted communication protocol message, wherein the message header of the communication protocol message includes the information bit(s) and the extension bit(s); and a sending unit 808 used for the converted communication protocol message to a receiving device.

In implementations, the anti-attack data transmission apparatus 800 may be, but is not limited to, applied to an application environment as shown in FIG. 2. A terminal 202, which acts as a sending device, conducts communications through a network 204 with a server 206, which acts as a receiving device, according to a predefined communication protocol. The network may include, but is not limited to, a local area network, a metropolitan area network, or a wide area network. The terminal may include, but is not limited to, a mobile phone, a PC machine, a laptop, or a tablet computer. The above is merely an example, on which the present embodiment does not impose any limitation.

It should be noted that the sending device may be, but is not limited to, a collection device that is capable of collecting data in the network. An example is a router which can collect communication protocol messages to be transmitted through a NET FLOW protocol.

Specifically, after obtaining a communication protocol message to be transmitted, the terminal 202 (which acts as the sending device) performs an anti-attack pre-processing on data located at information bit(s) of a message header of that message, generates corresponding processing information, stores the processing information at extension bit(s) in the message header of the communication protocol message, and sends a converted communication protocol message to the server 206 (which acts as the receiving device).

It should be noted that, in the present embodiment, a sending device directly performs an anti-attack pre-processing on data at information bit(s) of a communication protocol message to be transmitted, and stores processing information associated with the anti-attack pre-processing in extension bit(s) newly configured in the original communication protocol message. An operation of the anti-attack pre-processing is an operation performed on data at information bit(s) of a message header that is agreed upon between a sending device and a receiving device, to achieve a goal of defending against attack activities that occur during communications. In other words, after the sending device performs the anti-attack pre-processing that is agreed upon with the receiving device, the receiving device can directly perform parsing according to an agreement. If data can be obtained from the parsing, this is a normal data flow. If the parsing cannot be performed normally, a determination can be made that this is an abnormal data flow, and can be dropped directly to defend against an attack activity corresponding to the abnormal data flow. Therefore, improvements in the security and the accuracy of data transmission can be achieved during a process of conducting communications between a sending device and a receiving device according to a communication protocol without affect normal communications. This avoids the problem of false negatives of normally transmitted data flows caused by existing anti-attack methods.

In implementations, the communication protocol message can be, but is not limited to, TCP (Transmission Control Protocol). A data format of a TCP protocol message may include the following:

A data format of a TCP protocol message

| Source port (16 bits) | | | | | | | Target port (16 bits) |
|---|---|---|---|---|---|---|---|
| Sequence number (32 bits) | | | | | | | |
| Acknowledgement number (32 bits) | | | | | | | |
| Header length (4 bits) | Reserved (6 bits) | URG | ACK | PSH | RST | SYN | FIN | Window size (16 bits) |
| TCP checksum (16 bits) | | | | | | | Urgent pointer (16 bits) |
| Option (32 bits) | | | | | | | Fill-in |
| Data | | | | | | | |

As can be seen from the above content, the first 20 bytes in a TCP protocol message are fixed, and the latter 4N bytes are options that are added according to needs. The header length, URG, ACK, RST, SYN, FIN, the window size, the TPC checksum and the urgent pointer are information bits including important information in the TCP protocol message.

Being different from performing an anti-attack protection for an entire TCP protocol message in existing technologies, the present embodiment performs an anti-attack protection using data at information bit(s) of a message header. As such, a receiving device can perform cleaning and filtering on all data flows in a way different from the broadband flow cleaning when the TCP protocol message is received, thus avoiding the problem of incorrectly treating a normal data flow as an abnormal data flow. Therefore, the receiving device can implement directly filtering of communication protocol messages forged by attacking ends by determining whether data at corresponding information bit(s) can be parsed according to an agreed manner, thus further improving the accuracy of defending against attacking activities during a data transmission process. A message format of a converted communication message is given as follows:

A message format of a converted communication message

| Source port (16 bits) | Target port (16 bits) |
|---|---|
| Extension bit [(32-n) bits] | Sequence number (n bits) |
| Extension bit [(32-m) bits] | Acknowledgement number (m bits) |
| Information bit(s) after anti-attack pre-processing | |
| Data | |

In implementations, extension bits in the above communication protocol message can be, but are not limited to, extension bits that are added in an original communication protocol message. In other words, under a condition that a message length is not increased, some positions are set as extension bits used for storing processing information associated with an anti-attack pre-processing, thereby ensuring the security of data transmission without increasing the load overhead of the message.

In implementations, the anti-attack pre-processing may include, but is not limited to, at least one of the following operations:

1) adjusting an order of data on information bits;
2) entirely or partially compressing the data of the information bit(s), and filling a spare space with character(s) after compression;
3) entirely or partially encrypting the data of the information bit(s); or
4) entirely or partially signing the data of the information bit(s).

It should be noted that the entirety of the information bits is used to describe data on all the information bits. The partiality of the information bits is used to describe data in some information bits. Furthermore, the fill-in character can be, but is not limited to, a meaningless character, or may be, but is not limited to, extension bit(s) of other information. The present embodiment does not have any limitation thereon.

In implementations, prior to sending the converted communication protocol message to the receiving device, the apparatus is further configured to deploy network device(s). In other words, network device(s) in the network is/are placed according to a data flow that is actually transmitted.

In implementations, when the data flow is greater than a predefined threshold, gateway-type network device(s) is/are set up between the sending device and the receiving device, to help the network device(s) to relay a portion of the data flow to a third-party device, to avoid an occurrence of overloading of the original receiving device, thereby achieving a reduction in the workload of the device and avoiding the problem of a system breakdown of the receiving device due to the occurrence of the overloading.

In implementations, when the data flow is less than or equal to the predefined threshold, at least one of the following apparatuses can be directly set up in the sending device to perform the anti-attack pre-processing of the communication protocol message to be transmitted: a network card driver, a virtual network card, or a local gateway.

Using the embodiments provided by the present disclosure, a sending device directly performs an anti-attack pre-processing on data at information bit(s) of a communication protocol message to be transmitted, stores processing information associated with the anti-attack pre-processing in extension bit(s) newly configured in the original communication protocol message, and sends a converted communication protocol message to a receiving device. In other words, a sending device achieves distinguishing between a normal data flow and an abnormal data flow by sending a communication protocol message in which data at information bit(s) of a message header has undergone anti-attack pre-processing to a receiving device. This helps the receiving device to obtain a communication protocol message that is obtained by a correct parsing, and filter out an abnormal message that cannot be correctly parsed, thereby achieving a goal of accurately defending attacking activities that occur during transmission without affecting normal communications. This further avoids the problems of false negatives associated with normally transmitted data flow caused by existing anti-attack methods. Furthermore, in the present embodiments, only data at information bit(s) of a message header is undergone an anti-attack pre-processing, to achieve the transparency of a transmission link, thus avoiding converted communication protocol messages from deciphering, and further improving the security during data transmission.

In implementations, the anti-attack pre-processing unit 804 includes at least one of: an adjustment module 810, a compression module 812, an encryption module 814, or a signing module 816.

1) The adjustment module 810 is used for adjusting an order of the data at the information bit(s).

Details are described in conjunction with an example as follows. Information bits located in a message header of a TCP protocol message includes a header length, URG, ACK, RST, SYN, FIN, a window size, a TCP checksum and an urgent pointer. In the present embodiment, when an anti-attack pre-processing is performed on data at these information bits, an order of the data can be adjusted correspondingly to ensure a goal of performing the anti-attack pre-processing for the TCP protocol message to be achieved during a normal process of encapsulation and transmission of the TCP protocol message.

For example, a data format of a TCP protocol message that is converted may be given as follows:

| Source port (16 bits) | | Target port (16 bits) |
|---|---|---|
| Extension bit (4 bits) | Sequence number (28 bits) | |
| Extension bit (4 bits) | Acknowledgement number (28 bits) | |
| Header length (4 bits) | Reserved RST ACK PSH SYN URG FIN (6 bits) | Window size (16 bits) |
| TCP checksum (16 bits) | | Urgent pointer (16 bits) |
| Option (32 bits) | | Fill-in |
| Data | | |

As can be seen from the above content, in the present embodiment, by adjusting an order of URG, RST and SYN, a well-known positional relationship therebetween in a communication protocol message is changed, thereby achieving protection against third-party devices, and avoiding attacks produced by the third-party devices.

2) The compression module 812 is used for entirely or partially compressing the data at the information bit(s).

Details are described in conjunction with an example as follows. Information bits located in a message header of a TCP protocol message includes a header length, URG, ACK, RST, SYN, FIN, a window size, a TCP checksum and an urgent pointer. In the present embodiment, when an anti-attack pre-processing is performed on data at these information bits, data at the information bits can be wholly or partially compressed to ensure a goal of performing the anti-attack pre-processing for the TCP protocol message to be achieved during a normal process of encapsulation and transmission of the TCP protocol message.

For example, a data format of a TCP protocol message that is converted may be given as follows:

| Source port (16 bits) | | Target port (16 bits) |
|---|---|---|
| Extension bit (4 bits) | Sequence number (28 bits) | |
| Extension bit (4 bits) | Acknowledgement number (28 bits) | |
| Header length (4 bits) | Reserved URG ACK PSH RST SYN FIN (6 bits) | Window size (16 bits) |
| TCP checksum (10 bits) | Fill-in character (6 bits) | Urgent pointer (16 bits) |
| Option (32 bits) | | Fill-in |
| Data | | |

As can be seen from the above content, in the present embodiment, partial compression is performed on the TCP checksum, for example, from 16 bits to 10 bits, and certain characters is/are filled into the spare space after the compression, to change a positional relationship of the TCP checksum in the communication protocol message, thereby achieving protection against third-party devices, and avoiding attacks produced by the third-party devices.

3) The encryption module 814 is used for entirely or partially encrypting the data at the information bit(s).

In implementations, all the data in the information bits can be encrypted. Alternatively, only data in a portion of the information bits at predefined positions is encrypted. The present embodiment does not have any limitation on the method of encryption.

4) The signing module 816 is used for entirely or partially signing the data at the information bit(s).

In implementations, signing refers to a numeral string that can only be generated by a sender of information and cannot be forged by others. This numeral string is also effective evidence about the authenticity of the information sent by the sender of the information.

In implementations, all the data at the information bits is entirely undergone signature authentication. Alternatively, only data in a portion of the information bits at predefined positions is undergone partial signature authentication. The present embodiment does not have any limitation on the method of signing.

Using the embodiments provided by the present disclosure, by performing an anti-attack pre-processing on data located at information bit(s) of a message header of a communication protocol message through at least one of the above operations, the security of the communication protocol message to be transmitted is further improved by performing the pre-processing on the data of the message header. This thereby prevents a third-party device from initiating an attack after deciphering the above operation of the pre-processing. Furthermore, this also allows a receiving device to parse a converted communication protocol message that is obtained according to a manner corresponding to the operation of pre-processing, and corrects distinguishes between a normal data flow and an abnormal data flow, thus resolving the problem of false negatives occurring in the existing technologies.

In implementations, the apparatus 800 further includes a setting unit 818 used for setting a portion of bytes of the message header of the communication protocol message as extension bit(s), prior to performing the anti-attack pre-processing on the data at the information bit(s) of the message header of the communication protocol message.

In implementations, the setting unit 818 includes a setting module 820 used for setting a portion of bytes of a sequence number and/or an acknowledgement number in the message header as the extension bit(s).

In implementations, the anti-attack data transmission is implemented based on a TCP protocol message. Taking into consideration of the characteristics of the IP relay and the TCP protocol, the present embodiment implements pre-processing on a TCP protocol message that is to be transmitted without increasing the load overhead of the message (i.e., without increasing a length of the message) by setting a portion of original segments in a message header of the TCP protocol message as extension bits, thus ensuring the compatibility and the consistency of the TCP protocol in a transmission process.

It should be noted that a sequence number and an acknowledgement number in a TCP protocol message are both 32 bits. These two numbers are used for identifying a length of a previously transmitted message. Taking into consideration of a current network transmission environment, a maximum length of a single message is 8192 bytes (Jumbo frame length) under an Ethernet network. 32 bits may represent 2^32=4G bytes. Therefore, this portion of data has an available space. For example, 28 bits thereof are used as a sequence number, and each has 4 bits to be reserved for extension bits. As such, these 8 bits can be used for identifying processing information of the above pre-processing. At least one type of operations such as signing, TCP header reorganization, blurring, encryption, etc., is performed on data at information bits of a message header using these extension bits, and the TCP communication protocol message after conversion is sent to a receiving device.

Using the embodiments provided by the present disclosure, an operation of pre-processing on data at information bits of a message header using extension bits is implemented by setting the extension bits in an original communication protocol message. This helps a receiving device to correctly parse corresponding data according to an agreement, and thereby accurately distinguish between a normal data flow and an abnormal data flow. Accordingly, the problem of false negatives of normal transmitted data flows that exist in the existing technologies is resolved.

In implementations, the apparatus 800 further includes a determination unit 822 used for determining whether a data flow of the current communication protocol message is greater than a predefined threshold; and a deployment unit 824 used for deploying a gateway-type network device in a transmission link before reaching the receiving device if the data flow is greater than the predefined threshold, to allow the gateway-type network device to act as the receiving device to relay the converted communication protocol message to a third-party device.

In implementations, when a data flow is greater than a predefined threshold, a gateway-type network device is set up between the sending device and the receiving device, to allow the gateway-type network device to relay a portion of the data flow to a third-party device, thus avoiding an occurrence of overloading of the original receiving device. The workload of the device is thereby reduced, and the receiving device is avoided from the problem of system breakdown due to overloading. The predefined threshold can be, but is not limited to, determined according to processing workload of the receiving device.

In implementations, the apparatus 800 may include one or more computing devices. In implementations, the apparatus 800 may be a part of one or more computing devices which may be located in a single place or distributed over a network such as a cloud computing architecture. By way of example and not limitation, the apparatus 800 may be included in a sending device 826, which may include one or more processors 828, an input/output (I/O) interface 830, a network interface 832, and memory 834.

The memory 834 may include a form of computer readable media such as a volatile memory, a random access memory (RAM) and/or a non-volatile memory, for example, a read-only memory (ROM) or a flash RAM. The memory 834 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 834 may include program units 836 and program data 838. The program units 836 include the units and the modules as described in the foregoing description.

Details are described in conjunction with the following example. A TCP protocol message is used as an example. As shown in FIG. 3, before the terminal 202 sends a TCP protocol message to the server 206, the terminal 202 (which acts as a sending device) can determine whether the server 206 (which acts as a receiving device) can operate normally based on a current network flow. For example, if a predefined threshold is 100M and a current data flow is 120M, the terminal 202 deploys a gateway-type network device 302 in a network upon determining that the data flow is greater than the predefined threshold after comparison, in order to allow the gateway-type network device 302 to transmit the excess 20M of data flow to a third-party device, thus avoiding the problem of a system breakdown of the receiving device due to overloading.

Using the embodiments provided by the present disclosure, a comparison of size relationship between a data flow of a current communication protocol message and a predefined threshold is performed first to facilitate a determination of whether to deploy a gateway-type network device in a transmission link, thereby successfully avoiding the problem of a system breakdown of a receiving device due to overloading in an anti-attack process.

In implementations, the anti-attack pre-processing unit includes at least one of a network card driver, a virtual network card, or a local gateway.

Details are described in conjunction with the following example.

In implementations, a TCP protocol message is used as an example as shown in FIG. 4. A terminal which acts as a sending device is deployed with a TCP client 402, and a server which acts as a receiving device is deployed with a TCP server 404. In the present embodiment, a network card driver 406-1 is set up as an anti-attack apparatus in the TCP client, to implement the pre-processing operation in the anti-attack transmission method as described above. The TCP server is set up with a network card driver 406-2, which acts as an anti-attack checking apparatus for implementing the parsing operation in the anti-attack transmission method as described above.

It should be noted that the TCP client still conducts communications normally using a physical network card in the present embodiment, except that the network card driver checks destinations of the communications. If found to conducts a communication with an external TCP protocol anti-attack checking apparatus, a data message is processed according to a format that is agreed upon in advance. Otherwise, the original message is sent to a destination.

In implementations, a TCP protocol message is used as an example as shown in FIG. 5. A terminal which acts as a sending device is deployed with a TCP client 402, and a server which acts as a receiving device is deployed with a TCP server 404. In the present embodiment, a virtual card 502-1 is set up as an anti-attack apparatus in the TCP client, to implement the pre-processing operation in the anti-attack transmission method as described above. The TCP server is set up with a virtual card 502-2, which acts as an anti-attack checking apparatus for implementing the parsing operation in the anti-attack transmission method as described above.

It should be noted that this type is relatively similar to a link tunnel in the present embodiment. The TCP client only needs to send data to a designated network card. Physical link changes are not perceived in actual operations. All communications with an external TCP protocol anti-attack checking apparatus are handled by the virtual network card.

In implementations, a TCP protocol message is used as an example as shown in FIG. 6. A terminal which acts as a sending device is deployed with a TCP client, and a server which acts as a receiving device is deployed with a TCP server. In the present embodiment, a local gateway 602-1 is set up as an anti-attack apparatus in the TCP client, to implement the pre-processing operation in the anti-attack transmission method as described above. The TCP server is set up with a local gateway 602-2, which acts as an anti-attack checking apparatus for implementing the parsing operation in the anti-attack transmission method as described above.

It should be noted that the TCP client only needs to establish a communication relationship with the local gateway in this type of scenario in the present embodiment. The local gateway is responsible for communicating with an external TCP protocol anti-attack checking apparatus.

Using the embodiments provided by the present disclosure, the above anti-attack data transmission can be implemented using different apparatuses, thus implementing diversification of anti-attack control.

Fourth Embodiment

Figure 9:
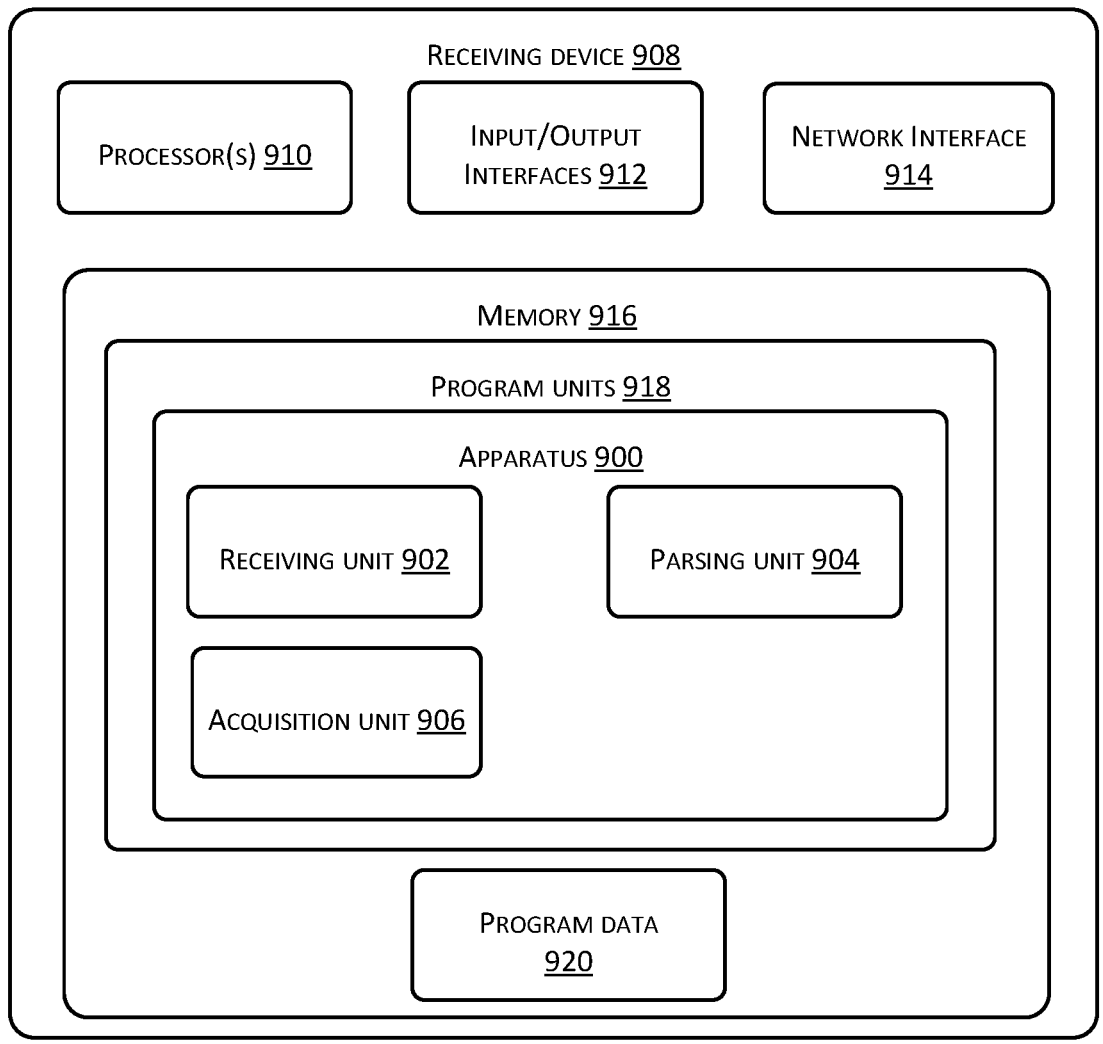
FIG. 9 is a schematic diagram illustrating an anti-attack data transmission apparatus in accordance with another option of embodiments of the present disclosure.

According to the embodiments of the present disclosure, an embodiment of an anti-attack data transmission apparatus is provided. The apparatus is located in a receiving device. As shown in FIG. 9, the apparatus 900 includes a receiving unit 902 used for receiving a communication protocol message that is converted after being undergone an anti-attack pre-processing; a parsing unit 904 used for parsing the converted communication protocol message according to processing information associated with the anti-attack pre-processing indicated by extension bit(s) located in a message header of the converted communication protocol message; and an acquisition unit 906 used for obtaining data located at information bit(s) of the message header of the converted communication protocol message, wherein the message header of the communication protocol message includes the information bit(s) and the extension bit(s).

In implementations, the apparatus 900 may be a part of one or more computing devices which may be located in a single place or distributed over a network such as a cloud computing architecture. By way of example and not limitation, the apparatus 900 may be included in a receiving device 908, which may include one or more processors 910, an input/output (I/O) interface 912, a network interface 914, and memory 916. The memory 916 may include a form of computer readable media as described in the foregoing description.

In implementations, the memory 916 may include program units 918 and program data 920. The program units 918 include the receiving unit 902, the parsing unit 904, and the acquisition unit 906 as described in the foregoing description.

In implementations, the anti-attack data transmission apparatus 900 may be, but is not limited to, applied in an application environment as shown in FIG. 2. A terminal 202, which acts as a sending device, conducts communications through a network 204 with a server 206, which acts as a receiving device, according to a predefined communication protocol. The network may include, but is not limited to, a local area network, a metropolitan area network, or a wide area network. The terminal may include, but is not limited to, a mobile phone, a PC machine, a laptop, or a tablet computer. The above is merely an example, on which the present embodiment does not impose any limitation.

It should be noted that the receiving device may be, but is not limited to, a router. A communication protocol message is obtained by installing a predefined program in the router to implement parsing of processing information associated with an anti-attack pre-processing indicated by extension bit(s) located in a message header of the converted communication protocol message that is received.

Specifically, the server 206 (which acts as the receiving device) receives a communication protocol message that is obtained from conversion after an anti-attack pre-processing, and also parses the converted communication protocol message according to processing information associated with the anti-attack pre-processing indicated by extension bit(s) located in a message header of the converted communication protocol message, to obtain data located at information bit(s) of the message header of the converted communication protocol message. The message header of the communication protocol message includes information bits and extension bits.

It should be noted that, in the present embodiment, a sending device directly performs an anti-attack pre-processing on data at information bit(s) of a communication protocol message to be transmitted, and stores processing information associated with the anti-attack pre-processing in extension bit(s) newly configured in the original communication protocol message, to enable a receiving device to parse and obtain data on the information bit(s) of the message header according to an agreement between the two parties. If data can be correctly parsed, this is a normal data flow. If it is not able to be parsed correctly, a determination can be made that this is an abnormal data flow, and can be dropped directly to defend against an attack activity corresponding to the abnormal data flow. Therefore, improvements in the security and the accuracy of data transmission can be achieved during a process of conducting communications between a sending device and a receiving device according to a communication protocol without affect normal communications. This avoids the problem of false negatives of normally transmitted data flows caused by existing anti-attack methods.

In implementations, the communication protocol message can be, but is not limited to, TCP (Transmission Control Protocol). A data format of a TCP protocol message may include the following:

A data format of a TCP protocol message

| Source port (16 bits) | Target port (16 bits) |
|---|---|
| Sequence number (32 bits) | |
| Acknowledgement number (32 bits) | |
| Header length (4 bits) Reserved URG ACK PSH RST SYN FIN (6 bits) | Window size (16 bits) |
| TCP checksum (16 bits) | Urgent pointer (16 bits) |
| Option (32 bits) | Fill-in |
| Data | |

As can be seen from the above content, the first 20 bytes in a TCP protocol message are fixed, and the latter 4N bytes are options that are added according to needs. The header length, URG, ACK, RST, SYN, FIN, the window size, the TPC checksum and the urgent pointer are information bits including important information in the TCP protocol message.

Being different from performing an anti-attack protection for an entire TCP protocol message in existing technologies, the present embodiment performs an anti-attack protection using data at information bit(s) of a message header. As such, a receiving device can perform cleaning and filtering on all data flows in a way different from the broadband flow cleaning when the TCP protocol message is received, thus avoiding the problem of incorrectly treating a normal data flow as an abnormal data flow. Therefore, the receiving device can implement directly filtering of communication protocol messages forged by attacking ends by determining whether data at corresponding information bit(s) can be parsed according to an agreed manner, thus further improving the accuracy of defending against attacking activities during a data transmission process. A message format of a converted communication message is given as follows:

A message format of a converted communication message

| Source port (16 bits) | Target port (16 bits) |
|---|---|
| Extension bit [(32-n) bits] | Sequence number (n bits) |
| Extension bit [(32-m) bits] | Acknowledgement number (m bits) |
| Information bit(s) after anti-attack pre-processing | |
| Data | |

In implementations, extension bits in the above communication protocol message can be, but are not limited to, extension bits that are added in an original communication protocol message. In other words, under a condition that a message length is not increased, some positions are set as extension bits used for storing processing information associated with an anti-attack pre-processing, thereby ensuring the security of data transmission without increasing the load overhead of the message.

In implementations, the anti-attack pre-processing may include, but is not limited to, at least one of the following operations:

1) adjusting an order of data on information bits;
2) entirely or partially compressing the data of the information bit(s), and filling a spare space with character(s) after compression;
3) entirely or partially encrypting the data of the information bit(s); or
4) entirely or partially signing the data of the information bit(s).

It should be noted that the entirety of the information bits is used to describe data on all the information bits. The partiality of the information bits is used to describe data in some information bits. Furthermore, the fill-in character can be, but is not limited to, a meaningless character, or may be, but is not limited to, extension bit(s) of other information. The present embodiment does not have any limitation thereon.

In implementations, prior to sending the converted communication protocol message to the receiving device, the apparatus may further be configured to deploy network device(s). In other words, network device(s) in the network is/are placed according to a data flow that is actually transmitted.

In implementations, when the data flow is greater than a predefined threshold, gateway-type network device(s) is/are set up between the sending device and the receiving device, to help the network device(s) to relay a portion of the data flow to a third-party device, to avoid an occurrence of overloading of the original receiving device, thereby achieving a reduction in the workload of the device and avoiding the problem of a system breakdown of the receiving device due to the occurrence of the overloading.

In implementations, when the data flow is less than or equal to the predefined threshold, at least one of the following apparatuses can be directly set up in the sending device to perform the anti-attack pre-processing of the communication protocol message to be transmitted: a network card driver, a virtual network card, or a local gateway.

Using the embodiments of the present disclosure, the server 206, which acts as a receiving device, receives a communication protocol message that is converted after being undergone an anti-attack pre-processing, and parses the converted communication protocol message according to processing information associated with the anti-attack pre-processing indicated by extension bit(s) of a message header of the converted communication protocol message to obtain data located at information bit(s) of the message header of the converted communication protocol message. The message header of the communication protocol message includes information bits and extension bits. In other words, the receiving device parses the data on the information bits of the message header of the communication protocol message that is received, processes a normal data flow that is correctly parsed, and filters an abnormal data flow, thus achieving to distinguish between normal data flows and abnormal data flows. This helps the receiving device to achieve a goal of accurately defending against attack activities in a communication process without affecting normal communications by obtaining communication protocol messages that are correctly parsed and filtering abnormal messages that cannot be correctly parsed. The problem of incorrectly determining normally transmitted data flows caused by existing anti-attack methods is prevented.

In implementations, the parsing unit 904 includes at least one of a network card driver, a virtual network card, or a local gateway.

Details are described in conjunction with the following example.

In implementations, a TCP protocol message is used as an example as shown in FIG. 4. A terminal which acts as a sending device is deployed with a TCP client 402, and a server which acts as a receiving device is deployed with a TCP server 404. In the present embodiment, a network card driver 406-1 is set up as an anti-attack apparatus in the TCP client, to implement the pre-processing operation in the anti-attack transmission method as described above. The TCP server is set up with a network card driver 406-2, which acts as an anti-attack checking apparatus for implementing the parsing operation in the anti-attack transmission method as described above.

It should be noted that the TCP client still conducts communications normally using a physical network card in the present embodiment, except that the network card driver checks destinations of the communications. If found to conducts a communication with an external TCP protocol anti-attack checking apparatus, a data message is processed according to a format that is agreed upon in advance. Otherwise, the original message is sent to a destination.

In implementations, a TCP protocol message is used as an example as shown in FIG. 5. A terminal which acts as a sending device is deployed with a TCP client 402, and a server which acts as a receiving device is deployed with a TCP server 404. In the present embodiment, a virtual card 502-1 is set up as an anti-attack apparatus in the TCP client, to implement the pre-processing operation in the anti-attack transmission method as described above. The TCP server is set up with a virtual card 502-2, which acts as an anti-attack checking apparatus for implementing the parsing operation in the anti-attack transmission method as described above.

It should be noted that this type is relatively similar to a link tunnel in the present embodiment. The TCP client only needs to send data to a designated network card. Physical link changes are not perceived in actual operations. All communications with an external TCP protocol anti-attack checking apparatus are handled by the virtual network card.

In implementations, a TCP protocol message is used as an example as shown in FIG. 6. A terminal which acts as a sending device is deployed with a TCP client, and a server which acts as a receiving device is deployed with a TCP server. In the present embodiment, a local gateway 602-1 is set up as an anti-attack apparatus in the TCP client, to implement the pre-processing operation in the anti-attack transmission method as described above. The TCP server is set up with a local gateway 602-2, which acts as an anti-attack checking apparatus for implementing the parsing operation in the anti-attack transmission method as described above.

It should be noted that the TCP client only needs to establish a communication relationship with the local gateway in this type of scenario in the present embodiment. The local gateway is responsible for communicating with an external TCP protocol anti-attack checking apparatus.

Using the embodiments provided by the present disclosure, the above anti-attack data transmission can be implemented using different apparatuses, thus implementing diversification of anti-attack control.

Fifth Embodiment

The embodiments of the present disclosure provide a computer terminal. The computer terminal can be any one computer terminal device in a group of computer terminals. In implementations, the computer terminal can be replaced with a terminal device such as a mobile terminal.

In implementations, the computer terminal can be located in at least one network device among a plurality of network devices of a computer network.

In implementations, the computer terminal can execute operations of program codes in an anti-attack pre-processing method of an application program as follows:

S1: obtaining a communication protocol message to be transmitted;

S2: performing an anti-attack pre-processing on data located at information bit(s) of a message header of the communication protocol message to generate processing information;

S3: storing the processing information in extension bit(s) in the message header of the communication protocol message to obtain a converted communication protocol message, wherein the message header of the communication protocol message includes the information bit(s) and the extension bit(s); and S4: sending the converted communication protocol message to a receiving device.

One of ordinary skill in the art can understand that all or some of the operations in the various methods of the above embodiments can be completed by instructing related hardware of a terminal device through a program. The program can be stored in a computer readable storage media. The storage media can include a flash drive, a read-only memory (ROM), a random access memory (RAM), a magnetic disk, or an optical disk, etc.

Sixth Embodiment

The embodiments of the present disclosure provide a computer server. The computer server can be any one computer server device in a group of computer servers.

In implementations, the computer server can be located in at least one network device among a plurality of network devices of a computer network.

In implementations, the computer server can execute operations of program codes in an anti-attack pre-processing method of an application program as follows:

S1: receiving a communication protocol message that is converted after being undergone an anti-attack pre-processing;

S2: parsing the converted communication protocol message according to processing information associated with the anti-attack pre-processing indicated by extension bit(s) located in a message header of the converted communication protocol message; and S3: obtaining data located at information bit(s) of the message header of the converted communication protocol message, wherein the message header of the communication protocol message includes the information bit(s) and the extension bit(s).

One of ordinary skill in the art can understand that all or some of the operations in the various methods of the above embodiments can be completed by instructing related hardware of a terminal device through a program. The program can be stored in a computer readable storage media. The storage media can include a flash drive, a read-only memory (ROM), a random access memory (RAM), a magnetic disk, or an optical disk, etc.

Seventh Embodiment

The embodiments of the present disclosure provide a storage media. In implementations, the storage media can be used for storing program codes that are executed by the anti-attack data transmission method provided by the first embodiment.

In implementations, the storage media is configured to store program codes that are used for performing the following operations:

S1: obtaining a communication protocol message to be transmitted;

S2: performing an anti-attack pre-processing on data located at information bit(s) of a message header of the communication protocol message to generate processing information;

S3: storing the processing information in extension bit(s) in the message header of the communication protocol message to obtain a converted communication protocol message, wherein the message header of the communication protocol message includes the information bit(s) and the extension bit(s); and S4: sending the converted communication protocol message to a receiving device.

In implementations, the storage media can include, but is not limited to, various types of media that are able to store program codes, such as a USB flash drive, a read-only memory (ROM), a random access memory (RAM), a movable drive, a magnetic disk, or an optical disk.

In implementations, specific examples in the present embodiment can be referenced to the examples described in the first embodiment and the second embodiment, and are not repeatedly described in the present embodiment herein.

Eighth Embodiment

The embodiments of the present disclosure provide a storage media. In implementations, the storage media can be used for storing program codes that are executed by the anti-attack data transmission method provided by the first embodiment.

In implementations, the storage media is configured to store program codes that are used for performing the following operations:

S1: receiving a communication protocol message that is converted after being undergone an anti-attack pre-processing;

S2: parsing the converted communication protocol message according to processing information associated with the anti-attack pre-processing indicated by extension bit(s) located in a message header of the converted communication protocol message; and S3: obtaining data located at information bit(s) of the message header of the converted communication protocol message, wherein the message header of the communication protocol message includes the information bit(s) and the extension bit(s).

In implementations, the storage media can include, but is not limited to, various types of media that are able to store program codes, such as a USB flash drive, a read-only memory (ROM), a random access memory (RAM), a movable drive, a magnetic disk, or an optical disk.

In implementations, specific examples in the present embodiment can be referenced to the examples described in the first embodiment and the second embodiment, and are not repeatedly described in the present embodiment herein.

The sequence numbers of the foregoing embodiments of the present disclosure are merely used for the purpose of description, and do not imply the qualities of the embodiments.

In the foregoing embodiments of the present disclosure, the description of each embodiment has its own emphasis. Content that is not detailed in a certain embodiment can be referenced to the relevant description of another embodiment.

In the embodiments provided in the present disclosure, it should be understood that the disclosed content may be implemented in other manners. The apparatus embodiments described above are only exemplary. For example, a division of units is merely division based on logical functions and other division approaches can exist in practical implementations. For example, a plurality of units or components may be combined or integrated into another system, or some features may be ignored or not performed. In addition, mutual coupling or direct coupling or communication connections displayed or discussed may be indirect coupling or communication connections through some interfaces, units or modules, and may be implemented in an electrical or other form.

The units described as separate components may be or may not be physically separate. Components displayed as units may be or may not be physical units, and may be located at a single location or distributed among a plurality of network units. Some or all of the units may be selected according to actual needs to achieve the objectives of the solutions of the embodiments.

In addition, functional units in the embodiments of the present disclosure may be integrated into a single processing unit. Alternatively, each of the units may exist as an independent physical entity. Alternatively, two or more units may be integrated into a single unit. The integrated unit may be implemented in a form of hardware, or may be implemented in a form of a software functional unit.

When the integrated unit is implemented in a form of a software functional unit, and sold or used as an independent product, the integrated unit may be stored in a computer readable storage media. Based on such understanding, the essence of the technical solutions of the present disclosure, or the parts that make contributions to the existing technologies, or all or some of the technical solutions may be implemented in a form of a software product. The computer software product is stored in a storage media, and includes multiple instructions to cause a computing device (which may be a personal computer, a server, a network device or the like) to perform all or some of the steps of the methods described in the embodiments of the present disclosure. The foregoing storage media includes various media that can store program codes, such as a USB flash drive, a ROM, a RAM, a removable hard disk, a magnetic disk, or an optical disc.

The above are only preferred embodiments of the present disclosure. It should be noted by one of ordinary skill in the art that multiple improvements and modifications may be made without departing from the principles of the present disclosure, and such improvements and modifications should also be construed as falling within the scope of protection of the present disclosure.

The present disclosure may be further understood with clauses as follows.

Clause 1: An anti-attack data transmission method comprising: obtaining a communication protocol message to be transmitted; performing an anti-attack pre-processing for data on information bits located at a message header in the communication protocol message, and generating processing information; storing the processing information in extension bits at the message header of the communication protocol message to obtain a converted communication protocol message, wherein the message header of the communication protocol message includes the information bits and the extension bits; and sending the converted communication protocol message to a receiving device.

Clause 2: The method of Clause 1, wherein performing the anti-attack pre-processing for the data on the information bits located at the message header in the communication protocol message comprises at least one of: adjusting an order of the data on the information bits; entirely or partially compressing the data of the information bits, and filling a spare space with a character after compression; entirely or partially encrypting the data of the information bits; or entirely or partially signing the data of the information bits.

Clause 3: The method of Clause 1, wherein prior to performing the anti-attack pre-processing for the data on the information bits located at the message header in the communication protocol message, the method further comprises setting a portion of bytes located at the message header of the communication protocol message as the extension bits.

Clause 4: The method of Clause 3, wherein setting the portion of bytes located at the message header of the communication protocol message as the extension bits comprises setting a portion of bytes of a sequence number and/or an acknowledgement number in the message header as the extension bits.

Clause 5: The method of Clause 1, wherein prior to sending the converted communication protocol message to the receiving device, the method further comprises: determining whether a data flow of the current communication protocol message is greater than a predefined threshold; and deploying a gateway-type network device in a transmission link before reaching the receiving device if the data flow is greater than the predefined threshold, to allow the gateway-type network device to act as the receiving device to relay the converted communication protocol message to a third-party device.

Clause 6: The method of Clause 1, wherein an apparatus that performs the anti-attack pre-processing on the data located at the information bits of the message header of the communication protocol message includes at least one of a network card driver, a virtual network card, or a local gateway.

Clause 7: An anti-attack data transmission method comprising: receiving a communication protocol message that has been converted by an anti-attack pre-processing; analyzing and parsing the converted communication protocol message according to processing information that indicates the anti-attack pre-processing and is located at extension bits of a message header of the converted communication protocol message; and obtaining data located at information bits of the message header of the converted communication protocol message, wherein the message header of the communication protocol message includes the information bits and the extension bits.

Clause 8: The method of Clause 7, wherein an apparatus that analyzes and parses the converted communication protocol message according to the processing information that indicates the anti-attack pre-processing and is located at the extension bits of the message header of the converted communication protocol message includes at least one of a network card driver, a virtual network card, or a local gateway.

Clause 9: An anti-attack preprocessing apparatus, which is located in a sending device, the apparatus comprising: an acquisition unit used for obtaining a communication protocol message to be transmitted; an anti-attack pre-processing unit used for performing an anti-attack pre-processing on data located at information bits of a message header of the communication protocol message to generate processing information; a storage unit used for storing the processing information in extension bits in the message header of the communication protocol message to obtain a converted communication protocol message, wherein the message header of the communication protocol message includes the information bits and the extension bits; and a sending unit used for the converted communication protocol message to a receiving device.

Clause 10: The apparatus of Clause 9, wherein the anti-attack pre-processing unit includes at least one of: an adjustment module used for adjusting an order of the data at the information bits; a compression module used for entirely or partially compressing the data at the information bits; an encryption module used for entirely or partially encrypting the data at the information bits; or a signing module used for entirely or partially signing the data at the information bits.

Clause 11: The apparatus of Clause 9, further comprising a setting unit used for setting a portion of bytes of the message header of the communication protocol message as extension bits, prior to performing the anti-attack pre-processing on the data at the information bits of the message header of the communication protocol message.

Clause 12: The apparatus of Clause 11, further comprising a setting module used for setting a portion of bytes of a sequence number and/or an acknowledgement number in the message header as the extension bits.

Clause 13: The apparatus of claim 9, further comprising:
a determination unit used for determining whether a data flow of the communication protocol message is greater than a predefined threshold; and
a deployment unit used for deploying a gateway-type network device in a transmission link before reaching the receiving device if the data flow is greater than the predefined threshold, to allow the gateway-type network device to act as the receiving device to relay the converted communication protocol message to a third-party device.

Clause 14: The apparatus of Clause 9, wherein the anti-attack pre-processing unit includes at least one of a network card driver, a virtual network card, or a local gateway.

Clause 15: An anti-attack preprocessing apparatus, which is located in a receiving device, the apparatus comprising: a receiving unit used for receiving a communication protocol message that is converted after being undergone an anti-attack pre-processing; a parsing unit used for parsing the converted communication protocol message according to processing information associated with the anti-attack pre-processing indicated by extension bits located in a message header of the converted communication protocol message; and an acquisition unit used for obtaining data located at information bits of the message header of the converted communication protocol message, wherein the message header of the communication protocol message includes the information bits and the extension bits.

Clause 16: The apparatus of Clause 15, wherein the parsing unit includes at least one of a network card driver, a virtual network card, or a local gateway.

What is claimed is:

1. A method comprising:
obtaining a communication protocol message to be transmitted, the communication protocol message comprising at least a data segment and a header segment;
performing an operation of an anti-attack pre-processing on data located at information bits of the header segment in the communication protocol message, the operation including:
compressing at least one field of the information bits to generate a compressed field and a spare space,
filling the spare space with a character after compression, and
overwriting the at least one field with the compressed field and the spare space filled with the character;
generating processing information identifying the operation;
storing the processing information in extension bits at the header segment of the communication protocol message to obtain a converted communication protocol message, the header segment of the converted communication protocol message including the data located at the information bits and the extension bits; and
sending the converted communication protocol message to a receiving device.

2. The method of claim 1, wherein the operation of the anti-attack pre-processing on the data located at the information bits of the header segment in the communication protocol message comprises at least one of:
adjusting an order of the data on the information bits;
entirely or partially encrypting the data of the information bits; or
entirely or partially signing the data of the information bits.

3. The method of claim 1, further comprising setting a portion of bytes located at the header segment of the communication protocol message as the extension bits, prior to performing the anti-attack pre-processing for the data on the information bits located at the header segment in the communication protocol message.

4. The method of claim 3, wherein setting the portion of bytes located at the header segment of the communication protocol message as the extension bits comprises setting a portion of bytes of a sequence number and/or an acknowledgement number in the header segment as the extension bits.

5. The method of claim 1, wherein prior to sending the converted communication protocol message to the receiving device, the method further comprises:
determining whether a data flow of the converted communication protocol message is greater than a predefined threshold; and
deploying a gateway-type network device in a transmission link before reaching the receiving device if the data flow is greater than the predefined threshold, to allow the gateway-type network device to act as the receiving device to relay the converted communication protocol message to a third-party device.

6. The method of claim 1, wherein an apparatus that performs the anti-attack pre-processing on the data located at the information bits of the header segment of the communication protocol message includes at least one of a network card driver, a virtual network card, or a local gateway.

7. The method of claim 1, wherein the anti-attack pre-processing is agreed upon between a sending device that sends the converted communication protocol message and the receiving device in advance.

8. The method of claim 1, wherein the extension bits are added into the header segment without increasing a length of the communication protocol message.

9. A computer readable medium storing executable instructions that, when executed by one or more processors of a sending device, cause the one or more processors to perform acts comprising:
obtaining a communication protocol message to be transmitted, the communication protocol message comprising at least a data segment and a header segment;
performing an operation of an anti-attack pre-processing on data located at information bits of the header segment in the communication protocol message, the operation including:
compressing at least one field of the information bits to generate a compressed field and a spare space,
filling the spare space with a character after compression, and
overwriting the at least one field with the compressed field and the spare space filled with the character;
generating processing information identifying the operation;
storing the processing information in extension bits at the header segment of the communication protocol message to obtain a converted communication protocol message, the header segment of the converted communication protocol message including the data located at the information bits and the extension bits; and
sending the converted communication protocol message to a receiving device.

10. The computer readable medium of claim 9, wherein the operation of the anti-attack pre-processing on the data located at the information bits of the header segment in the communication protocol message comprises at least one of:
adjusting an order of the data on the information bits;
entirely or partially encrypting the data of the information bits; or
entirely or partially signing the data of the information bits.

11. The computer readable medium of claim 9, the acts further comprising setting a portion of bytes located at the header segment of the communication protocol message as the extension bits, prior to performing the anti-attack pre-processing for the data on the information bits located at the header segment in the communication protocol message.

12. The computer readable medium of claim 11, wherein setting the portion of bytes located at the header segment of the communication protocol message as the extension bits comprises setting a portion of bytes of a sequence number and/or an acknowledgement number in the header segment as the extension bits.

13. The computer readable medium of claim 9, wherein prior to sending the converted communication protocol message to the receiving device, the acts further comprise:
   determining whether a data flow of the converted communication protocol message is greater than a predefined threshold; and
   deploying a gateway-type network device in a transmission link before reaching the receiving device if the data flow is greater than the predefined threshold, to allow the gateway-type network device to act as the receiving device to relay the converted communication protocol message to a third-party device.

14. The computer readable medium of claim 9, wherein a component of the sending device that performs the anti-attack pre-processing on the data located at the information bits of the header segment of the communication protocol message includes at least one of a network card driver, a virtual network card, or a local gateway.

15. The computer readable medium of claim 9, wherein the anti-attack pre-processing is agreed upon between the sending device that sends the converted communication protocol message and the receiving device in advance.

16. The computer readable medium of claim 9, wherein the extension bits are added into the header segment without increasing a length of the communication protocol message.

17. A receiving device comprising:
   one or more processors;
   memory;
   a receiving unit stored in the memory and executable by the one or more processors that is used for receiving a communication protocol message, the communication protocol message being generated by performing an operation of an anti-attack pre-processing on original data located at information bits of a header segment in an original communication protocol message, the operation including:
      compressing at least one field of the information bits to generate a compressed field and a spare space,
      filling the spare space with a character after compression, and
      overwriting the at least one field with the compressed field and the spare space filled with the character;
   a parsing unit stored in the memory and executable by the one or more processors that is used for parsing the communication protocol message according to processing information stored at extension bits located in the header segment of the communication protocol message, the processing information identifying the operation; and
   an acquisition unit stored in the memory and executable by the one or more processors that is used for obtaining the data located at the information bits of the header segment of the communication protocol message, wherein the header segment of the communication protocol message includes the data located at the information bits and the extension bits .

18. The receiving device of claim 17, wherein the parsing unit includes at least one of a network card driver, a virtual network card, or a local gateway.

19. The receiving device of claim 17, wherein the operation of the anti-attack pre-processing on the original data located at the information bits of the header segment in the original communication protocol message comprises at least one of:
   adjusting an order of the original data on the information bits;
   entirely or partially encrypting the original data of the information bits; or entirely or partially signing the original data of the information bits.

20. The receiving device of claim 17, wherein the receiving device is further configured to treat the communication protocol message as an abnormal data flow and drop the communication protocol message in response to the parsing unit failing to correctly parse the communication protocol message.

* * * * *